(12) United States Patent
Nagler et al.

(10) Patent No.: US 11,837,991 B2
(45) Date of Patent: Dec. 5, 2023

(54) FLUID DRIVEN SOLAR PANEL CLEANING SYSTEM

(71) Applicant: HMI LTD, Kiryat Bialik (IL)

(72) Inventors: Ehud Nagler, Kiryat Tivon (IL); Menashe Shamir, Kiryat Bialik (IL)

( * ) Notice: Subject to any disclaimer, the term of this patent is extended or adjusted under 35 U.S.C. 154(b) by 209 days.

(21) Appl. No.: 17/276,148

(22) PCT Filed: Sep. 22, 2019

(86) PCT No.: PCT/IL2019/051045
§ 371 (c)(1),
(2) Date: Mar. 14, 2021

(87) PCT Pub. No.: WO2020/065644
PCT Pub. Date: Apr. 2, 2020

(65) Prior Publication Data
US 2021/0351740 A1  Nov. 11, 2021

Related U.S. Application Data

(60) Provisional application No. 62/895,512, filed on Sep. 4, 2019, provisional application No. 62/765,972, filed on Sep. 25, 2018.

(51) Int. Cl.
*B08B 3/02* (2006.01)
*H02S 40/10* (2014.01)
(Continued)

(52) U.S. Cl.
CPC ............ *H02S 40/10* (2014.12); *B08B 3/024* (2013.01); *B08B 13/00* (2013.01); *F03C 1/007* (2013.01);
(Continued)

(58) Field of Classification Search
CPC .......... H02S 40/10; F24S 40/20; B08B 3/024; B08B 13/00; F03C 1/007; H01M 10/46; H01M 2220/20
See application file for complete search history.

(56) References Cited

U.S. PATENT DOCUMENTS 3,147,767 A * 9/1964 Goss ...................... B60S 3/044
134/17
7,258,057 B2   8/2007 Nagler et al.
(Continued)

FOREIGN PATENT DOCUMENTS

CA        2885861 A1 * 3/2014 ............... E01H 3/02
CN     205701562 U    11/2016
(Continued)

*Primary Examiner* — Sharidan Carrillo

(57) ABSTRACT

A system for cleaning solar panels (photo-electric and/or water heating etc.) is driven by fluid driven motor (water and/or air driven motor) such as a piston motor or a vane motor. Some or all of the outlet water/air from the motor is used for cleaning the panels. The motor preferably also operates a cleaning mechanism, such as a rotating and or linear brush arrangement. The motor, gear system and/or components may be made from plastic. Optionally, a cleaning device travels along the edges of panels, optionally without requiring an additional rail structure. The cleaning device optionally includes a trailing water/air supply hose. In some embodiments, electrical components of the cleaning device are powered by an internal power supply. Control is optionally via an electrically actuated valve, a timer (for example a real time clock), a wireless receiver and/or a controller.

7 Claims, 20 Drawing Sheets

(51) Int. Cl.
*F24S 40/20* (2018.01)
*B08B 13/00* (2006.01)
*F03C 1/007* (2006.01)
*H01M 10/46* (2006.01)

(52) U.S. Cl.
CPC ............. *F24S 40/20* (2018.05); *H01M 10/46* (2013.01); *H01M 2220/20* (2013.01)

(56) References Cited

U.S. PATENT DOCUMENTS

| | | | |
|---|---|---|---|
| 8,813,303 B1 | 8/2014 | Meller et al. | |
| 9,676,097 B1 * | 6/2017 | Gallagher | ................ B25J 9/161 |
| 2013/0206173 A1 | 8/2013 | Zijlstra | |
| 2014/0150818 A1 | 6/2014 | Chow | |
| 2016/0294319 A1 * | 10/2016 | Ram | ...................... F24S 40/20 |
| 2020/0366235 A1 * | 11/2020 | Al-Otaibi | ................ B08B 1/008 |

FOREIGN PATENT DOCUMENTS

| | | | | |
|---|---|---|---|---|
| CN | 108311454 A | 7/2018 | | |
| EP | 1174195 A2 * | 1/2002 | ............ | B08B 3/026 |
| EP | 2600416 A2 | 6/2013 | | |
| KR | 20180011432 A | 2/2018 | | |
| WO | 2014168597 A1 | 10/2014 | | |
| WO | 2015083149 A1 | 6/2015 | | |
| WO | 2018142389 A1 | 8/2018 | | |

\* cited by examiner

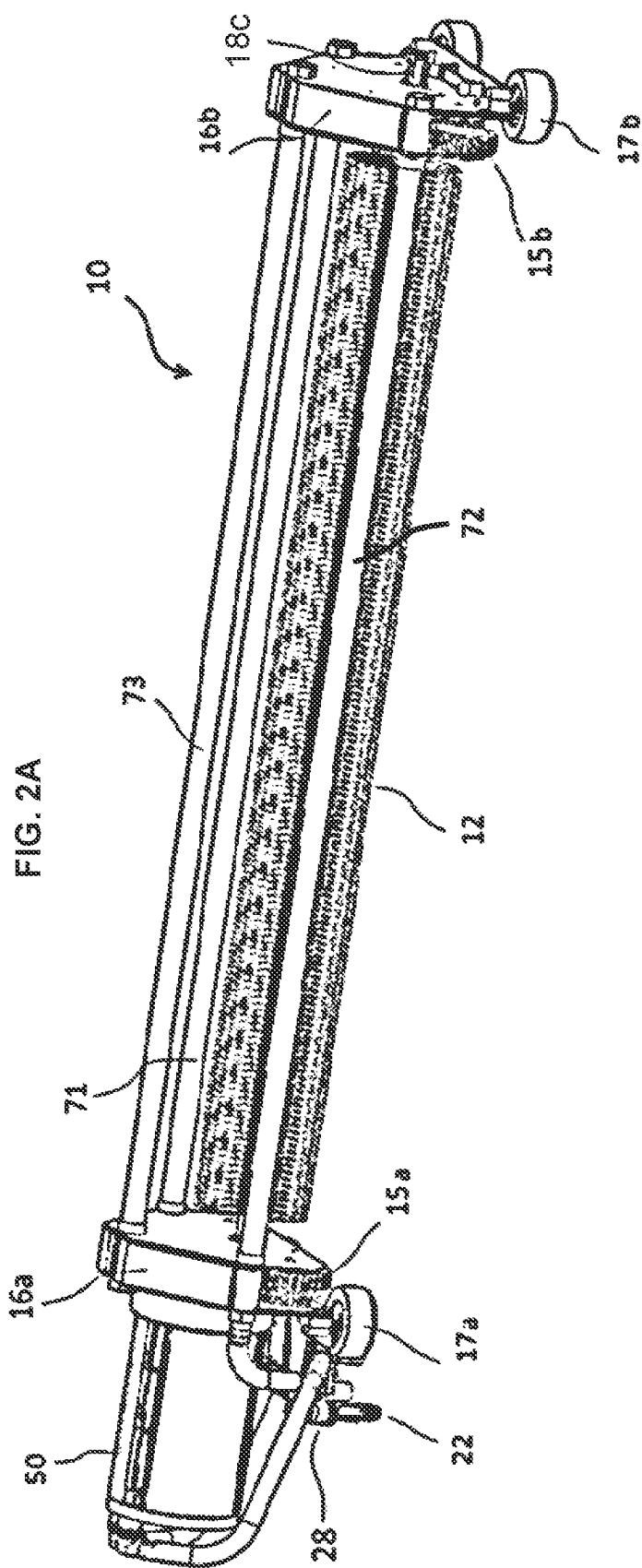

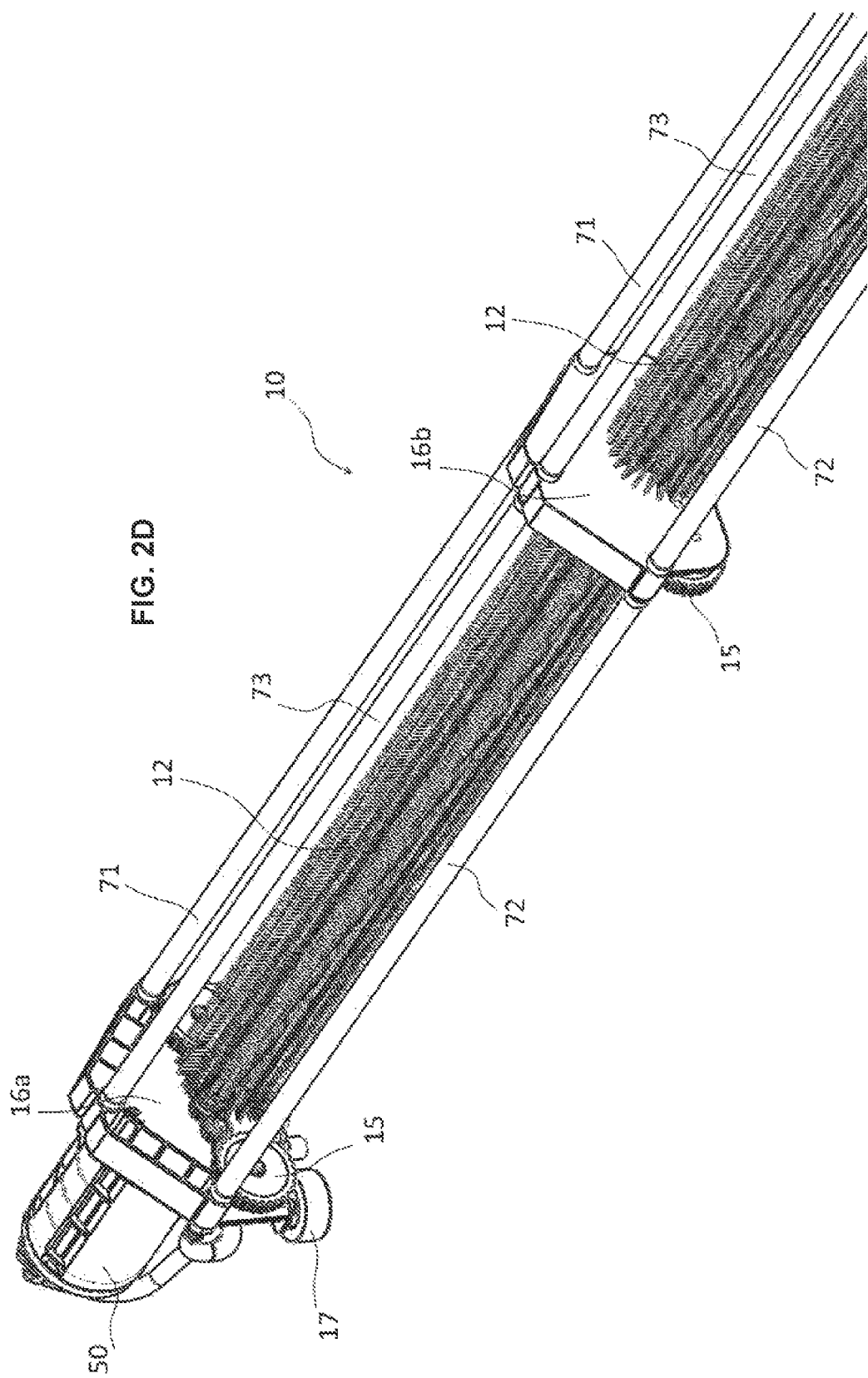

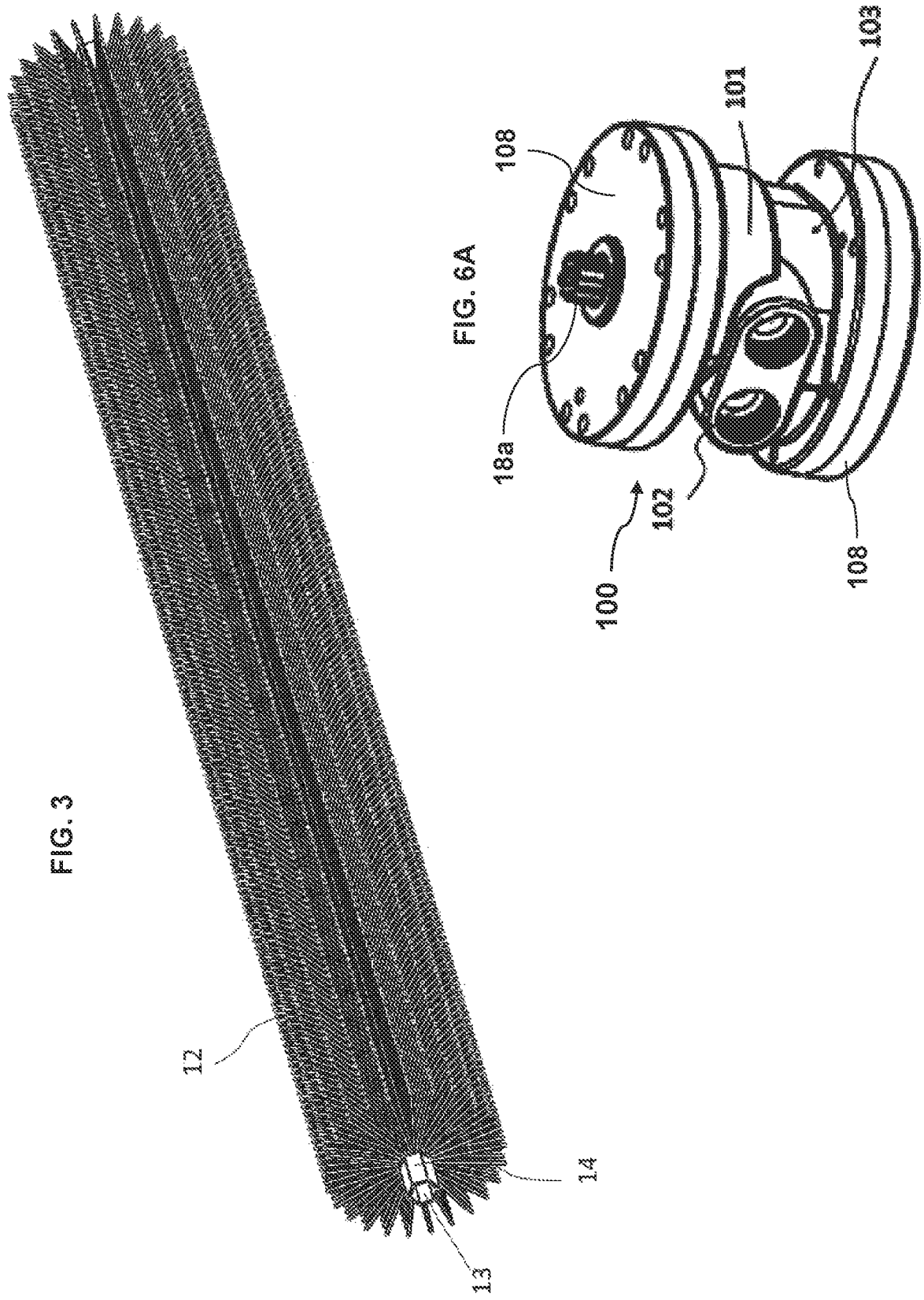

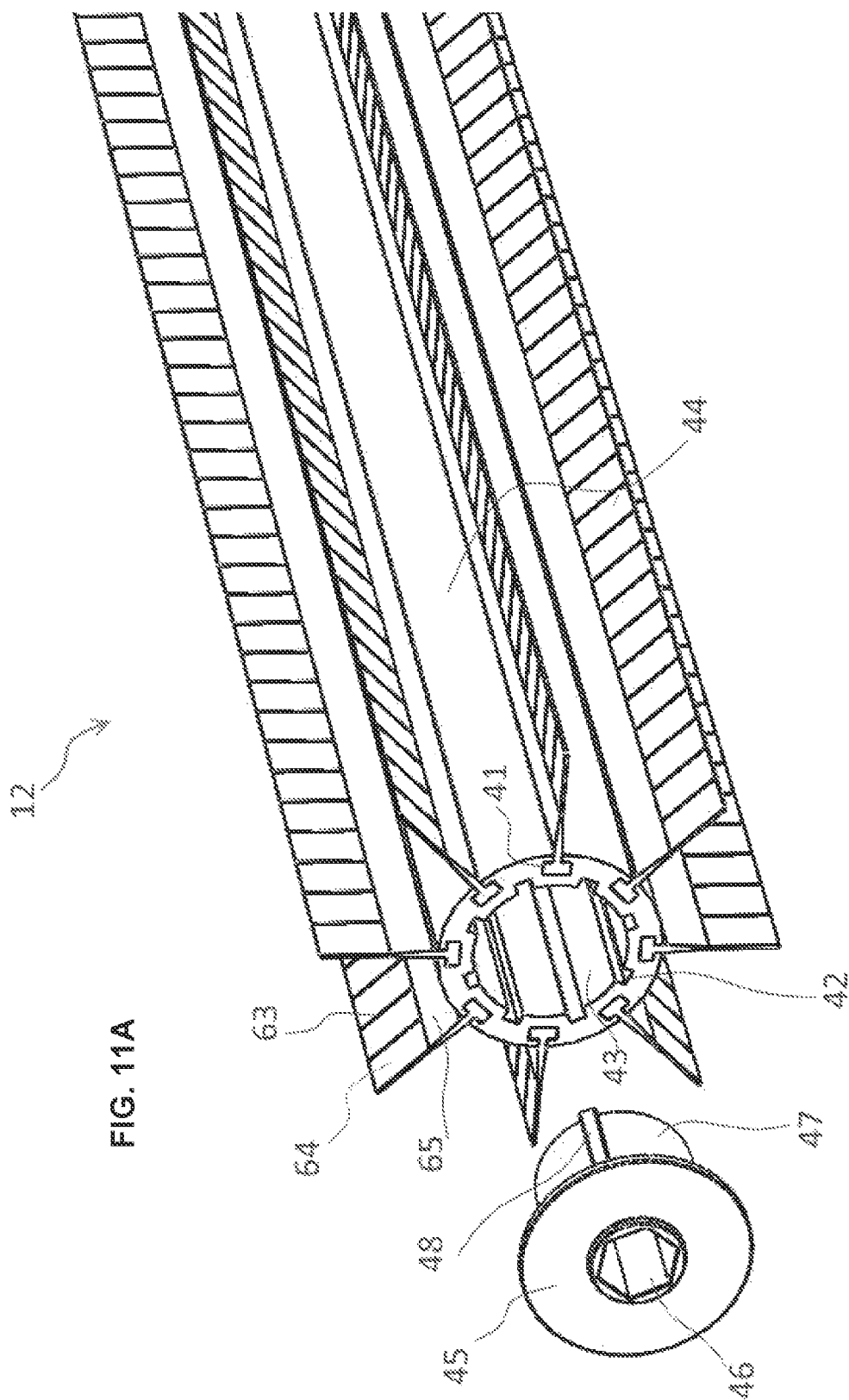

FLUID DRIVEN SOLAR PANEL CLEANING SYSTEM

RELATED APPLICATION/S

This application claims the benefit of priority under 35 USC § 119(e) of U.S. Provisional Patent Application No. 62/765,972 filed 25 Sep. 2018, the contents of which are incorporated herein by reference in their entirety.

This application claims the benefit of priority under 35 USC § 119(e) of U.S. Provisional Patent Application No. 62/895,512 filed 4 Sep. 2019, the contents of which are incorporated herein by reference in their entirety.

FIELD AND BACKGROUND OF THE INVENTION

The present invention, in some embodiments thereof, relates to a solar panel cleaning device and, more particularly, but not exclusively, to a fluid driven device for automated cleaning of solar panels.

International patent application no. WO2014168597 appears to relate to "to solar power engineering, in particular to cleaning the surfaces of solar battery panels. In the cleaner, water is used as working agent, the cleaning unit is equipped with a brush which is mounted on a movement mechanism and is intended for making contact with the surface being cleaned, the drive used is a hydraulic motor, the inlet to the chamber of which drive is connected to a water supply pipe, the cleaning unit consists of two carrying flanges, between which a perforated drum with a brush is mounted so as to rotate about a dedicated axis and is connected to a rotor of the hydraulic motor drive, the cavity in which is connected to the outlet of the hydraulic motor drive, the mechanism for moving the cleaner along a panel is in the form of two driving wheels, which are connected to the perforated drum, and two guide wheels which are mounted on two parallel guides which are intended for positioning said wheels beyond the limits of the working surface of the solar battery panel. The hydraulic motor drive carries out an advancing movement and rotation of the perforated drum by supplying water from the hydraulic motor system, the water also being usable for cleaning the panels."

U.S. Pat. No. 8,881,641 appears to disclose "a fluid-driven motor" having "a manifold with an arcuate seal including first and second valve openings and a sealing surface. A cylinder pivotally mounted on the manifold has a facing surface cooperating with the arcuate seal. The arcuate seal and the facing surface define a position-responsive valve configuration such that, when the cylinder assumes a neutral position, an aperture of the facing surface faces the sealing surface, and when the cylinder is angularly displaced in either direction, the aperture overlaps one or other of the valve openings, thereby connecting to the correspond fluid flow channel in the manifold. A pressure compensation volume underlies the sealing surface and receives fluid pressure from the fluid flow channels through valves, or from the internal volume of the cylinder, so that a pressure within the pressure compensation volume approaches a value no less than a current pressure within the internal volume."

U.S. Pat. No. 7,258,057 appears to disclose, "an engine that is actuated by a fluid under pressure, preferably water, and comprises one or more oscillating, connecting-rod assemblies (13), including a cylinder (14) and a piston (15), and at least one or more cranks (16) driven by the connecting-rod assemblies (13). For each connecting-rod assembly (13), a preferably stationary valve (20) controls the feed and the discharge of the pressure fluid to and from it, synchronically with the angular position of the corresponding crank (10), and acts as the pivot about which connecting-rod assembly (13) oscillates. The engine can be applied for producing mechanical work in any apparatus, for example in sprinklers, concrete mixers, apparatus for winding cables or garden hose reels, and so on, or for the production of electrical energy. The actuating fluid can be used, after its discharge from the engine, for purposes for which high pressure is not required."

Additional background art includes US Published Patent Application no. 20130206173, US Published Patent Application no. 20140150818, U.S. Pat. No. 10,122,319, International Published Patent Application no. WO2012168070, U.S. Pat. No. 8,771,432, International Published Patent Application no. WO2014168597, International Published Patent Application no. WO2017039426, Chinese Utility Model no. CN203470370U, US Published patent application no. 2018/0283348, U.S. Pat. No. 8,881,641 and/or U.S. Pat. No. 7,614,861 and/or U.S. Pat. No. 7,723,860 and/or US Published Patent Application no. 20130206173.

SUMMARY OF THE INVENTION

In accordance with the present invention, there is provided, a solar panel cleaning device comprising:

(a) a movable frame; (b) drive transmission; (c) driving wheels coupled to the transmission; (d) rotating brush for cleaning the solar panels; (e) first and second end-supports, configured for rotatably supporting the brush shaft; (d) a bidirectional water driven motor mechanically linked to the brush and driving wheels, the bidirectional motor being configured to operate under fluid pressure supplied to a first inlet to generate rotation in a first direction, and to operate under fluid pressure supplied to a second inlet to generate rotation in a second direction for driving the cleaning system back and forth along the panel row while turning the brush. the fluid drainage from the motor being used as a cleaning liquid by spraying the panels through nozzles. (e) a valve arrangement for selectively connecting a source of water pressure to each of the first and second inlets, and for connecting the drainage water to each of the third and fourth inlets to the spraying nozzles via third and fourth outlets.

According to a further feature of an embodiment of the present invention, the valve is configured to selectively assume: (a) a first state in which the source of water and motor inlets are blocked; (b) a second state in which the source of water is connected to the first motor inlet and the second inlet is connected to a first drainage line connected to nozzles arrangement spraying water selectively in front of the brush movement direction; and (c) a third state in which the source of water pressure is connected to the second motor inlet and the first inlet is connected to the second drainage line connected to a nozzles spraying water selectively in front of the brush movement direction;

According to a further feature of an embodiment of the present invention, the valve arrangement comprises at least one electrically actuated valve, the system further comprising a battery powered controller for selectively actuating the at least one electrically actuated valve, the controller being configured to operate from battery power without connection to an external electrical power supply.

According to further feature of an embodiment of the present invention, the electrically actuated valve includes a latching solenoid.

According to further feature of the present embodiment of the present invention, the controller is actuated by a manual switch attached to the valve assembly.

According to further feature of the present embodiment of the present invention, the controller is actuated by RF relay receiver, receives a start signal from a remote wireless transmitter.

According to a further feature of an embodiment of the present invention, the valve arrangement comprises at least one Timer for periodically actuating the system.

According to further feature of the present embodiment of the present invention, there is also provided at least one limit sensor for sensing the end edge of the panel array.

According to a further feature of another embodiment of the present invention, the water driven motor is a bidirectional piston motor mechanically linked to the brush and driving wheels, the bidirectional piston motor being configured to operate under fluid pressure supplied to a first inlet to generate rotation in a first direction, and to operate under fluid pressure supplied to a second inlet to generate rotation in a second direction for driving the cleaning system back and forth along the panel array while turning the brush. the fluid drainage from the motor being used as a cleaning liquid by spraying the panels through nozzles arrangement.

According to a further feature of another embodiment of the present invention, the water driven motor is a bidirectional vane motor mechanically linked to the brush and driving wheels, the bidirectional vane motor being configured to operate under fluid pressure supplied to a first inlet to generate rotation in a first direction, and to operate under fluid pressure supplied to a second inlet to generate rotation in a second direction for driving the cleaning system back and forth along the panel array while turning the brush. the fluid drainage from the motor being used as a cleaning liquid by spraying the panels through nozzles arrangement.

According to a further feature of another embodiment of the present invention the water driven motor is a semi directional piston motor mechanically linked to the brush and driving wheels, the semi directional piston motor being configured to operate under fluid pressure supplied to a first inlet to generate rotation in one direction for driving the cleaning system along the panel row while turning the brush. the fluid drainage from the motor second inlet being used as a cleaning liquid by spraying the panels through nozzles. similarly, reverse direction can be made by using a second semi directional piston motor or by applying an intermediate gear.

According to an aspect of some embodiments of the invention, there is provided a solar panel cleaning device including: a bi-directional hydraulic motor powered by fluid flow and producing an intermittent fluid output, a nozzle assembly receiving the intermittent fluid output from the hydraulic powered motor and configured to distribute the fluid output along the solar panel; a drive mechanism receiving mechanical power from the hydraulic motor and configured to provide bi directional movement to the nozzle assembly along a face of the solar panel, a direction of the movement corresponding to a direction of the motor.

According to some embodiments of the invention, the motor produces a torque between 2 to 25 Nm under input pressure less than 6 bar.

According to some embodiments of the invention, the motor rotates at a rate between 0 to 100 RPM.

According to some embodiments of the invention, the fluid flow of the motor is less than 1500 ml per meter of the movement of the nozzle assembly.

According to some embodiments of the invention, the movement of the nozzle assembly is controlled by an electronic controller.

According to some embodiments of the invention, the device further includes a battery supplying power to the electronic controller.

According to some embodiments of the invention, the device further includes a hydraulic generator configured to charge the battery.

According to some embodiments of the invention, the device further includes a plurality of valves controlled by the controller, the plurality of valves determining fluid input into the motor and wherein a rate and direction of the movement is determined by the fluid input.

According to some embodiments of the invention, the motor is a piston motor.

According to some embodiments of the invention, the motor is a vane motor.

According to some embodiments of the invention, input water to the motor is less than 6 bar.

According to some embodiments of the invention, the fluid includes water.

According to some embodiments of the invention, the fluid includes pressurized air.

According to some embodiments of the invention, the fluid includes a liquid-gas mixture.

According to some embodiments of the invention, the cleaning device is made a least 50 percent by volume of plastic materials.

According to some embodiments of the invention, the cleaning device weighs less than 25 Kg per one PV module.

According to some embodiments of the invention, the cleaning device include a fluid recirculation system.

According to some embodiments of the invention, the motor is configured to reverse direction of movement in response to a reversal in a flow direction of the fluid.

According to an aspect of some embodiments of the invention, there is provided a method of cleaning a solar panel including: Providing a fluid input at a pressure of less than 6 bar; Driving bi directional movement of a nozzle assembly along a solar panel with a hydraulic motor powered by the fluid input; wetting the solar panel with an intermittent water output from the hydraulic motor passing through the nozzle assembly.

According to some embodiments of the invention, driving includes the motor producing a torque between 2 to 25 Nm under input pressure less than 6 bar.

According to some embodiments of the invention, driving includes the motor rotating at a rate less than 100 RPM.

According to some embodiments of the invention, the method further includes outputting the water flow of the motor at a rate less than 1500 ml per meter of the movement of the nozzle assembly.

According to some embodiments of the invention, the method further includes controlling movement of the nozzle assembly with an electronic controller; and powering the electronic controller from a battery.

According to some embodiments of the invention, the method further includes charging the battery with a hydraulic generator.

According to some embodiments of the invention, the controlling further includes the controller operating a plurality of valves determining fluid input into the motor and wherein a rate and direction of the movement is determined by the fluid input.

According to some embodiments of the invention, the driving includes powering a cylinder with the fluid input.

According to some embodiments of the invention, the driving includes rotating a shaft of a vane motor with the fluid input.

According to some embodiments of the invention, the method further includes reversing a direction of movement of the motor by reversing a fluid flow direction.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2A is an isometric view of a solar panel cleaning device, constructed and operative according to an embodiment of the present invention;

FIG. 2D is a perspective view of modular panel cleaning device adjusted for cleaning a number of columns, constructed and operative according to an embodiment of the present invention;

FIG. 3 is an isometric view of a typical brush, constructed and operative according to an embodiment of the present invention;

FIG. 6A is an isometric view of a water-driven van-motor 100, constructed and operative according to an embodiment of the present invention;

FIG. 11A to 11C are isometric views of a rotational panel cleaning brush-roller, constructed and operative according to an embodiment of the present invention;

DESCRIPTION OF SPECIFIC EMBODIMENTS OF THE INVENTION

Figure 1:
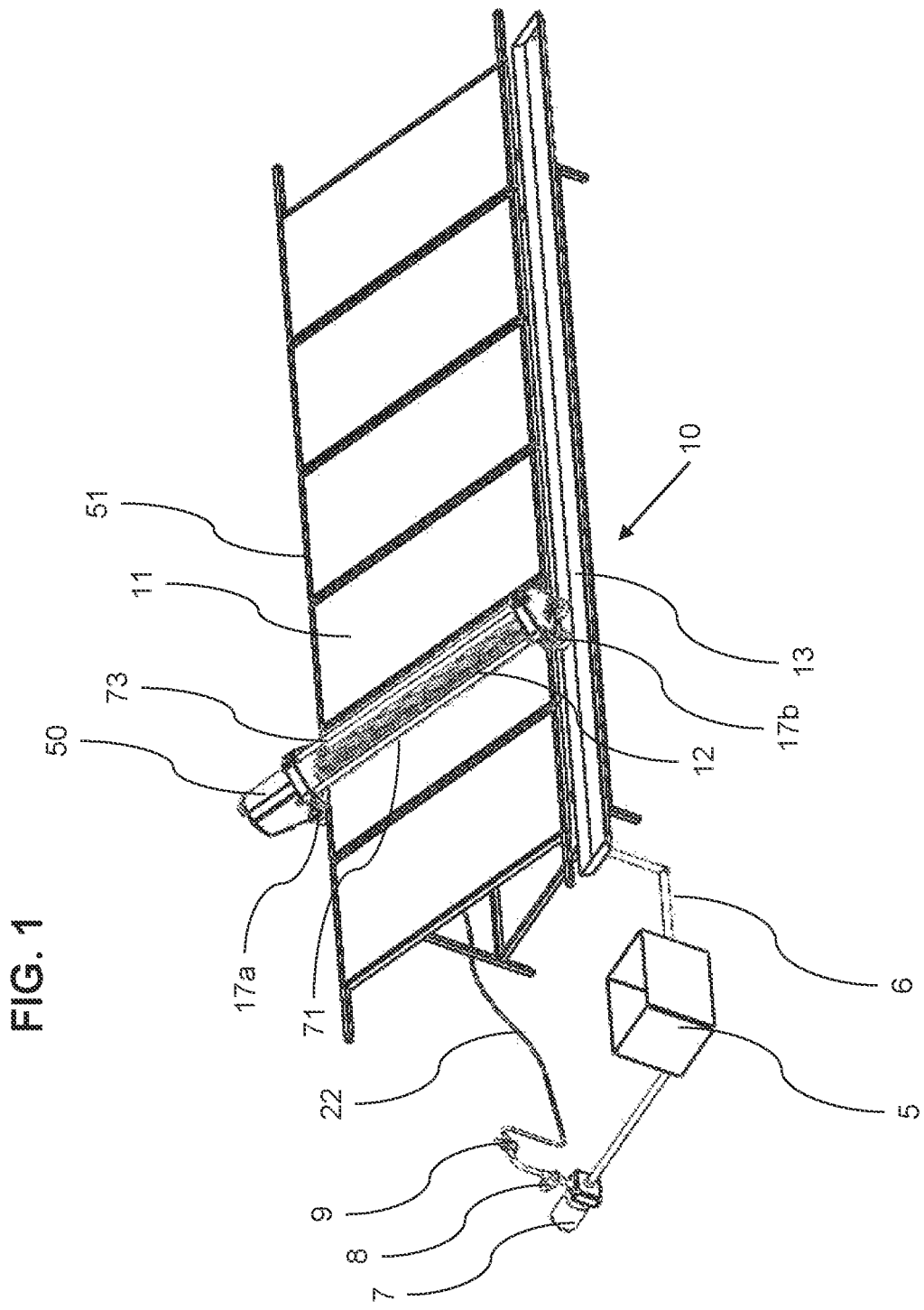
FIG. 1 is a schematic block diagram of an embodiment of a solar panel cleaning system constructed and operative according to an embodiment of the present invention.

The present invention, in some embodiments thereof, relates to a solar panel cleaning device and, more particularly, but not exclusively, to a fluid driven device for automated cleaning of solar panels.

Overview

An aspect of some embodiment of the current invention relates to a hydro-powered solar panel cleaning device and method. Optionally the device includes a fixed displacement motor, for example a piston motor and/or a vane motor. For example, the system is powered by a domestic water source for example at a pressure of less than 8 bar. Optionally, the motor uses between 0.5 to 4 liters of water per meter of movement of the cleaning device. In some embodiments pressurized gas (e.g. air) and/or a an air water mixture (for example produced by a Venturi nozzle) may be used to power the motor. For example, using air and/or air with water may save water. Optionally, water draining from the motor is used to clean the panel.

An aspect of some embodiment of the current invention relates to a hydro-powered solar panel cleaning device and method. For example, the system is powered by a domestic water source for example at a pressure of less than 8 bar. In some embodiments, the motor uses and/or drains an intermittent flow of water. Optionally, the motor uses between 0.5 to 4 liters of water per meter of movement of the cleaning device. Optionally, water draining from the motor is used to clean the panel.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Specific Embodiments

Referring to the drawings, FIG. 1 illustrates an example of a panel cleaning system 10, constructed and operative according to an embodiment of the present invention. Optionally the system cleans a solar panel array 11. For example, water is sprayed on the panel through nozzles in a hollow bar 71 and cleaned by a brush 12. Optionally the entire system 10 passes across the panel. For example, a hydraulic motor drives the system 10 along the panel. For example, the device may roll along the panel on wheels 17a, 17b. Optionally, wheels 17a, 17b and/or brush 12 and/or another drive wheel (for example wheels 15a, 15b as illustrated for example in FIGS. 2A-2C) may be driven by motor 50 to propel the system 10 across the panel. Optionally, the exhaust fluid from the motor 50 is used for spraying onto the panel 11. for cleaning. In some embodiments, all of the fluid used to drive the motor is deposited onto the panel. Alternatively or additionally, a portion of the fluid may drained off without spraying onto the panel. For example, between 90-100% and/or between 70 to 90% and/or between 30 to 70% and/or between 0 to 30% of the drive fluid may be sprayed onto the panel for cleaning. Optionally, assembly 10 is made mostly of plastic. For example, by volume, 70-100% of the assembly may be plastic and/or 30 to 70%. For example, the use of plastic parts (e.g. P.P., PBT, Acetal) may make the assembly 10 light. For example, the weight of a panel cleaner of length between 0.8 to 2 m in accordance with the current invention may weight between 20 to 70 kg. and/or between and/or between 10 to 35 kg/m and/or between 35 to 70 kg/m. For the purpose of the current specification, unless specified otherwise, the term fluid includes incompressible fluids as well as compressible gas. The term liquid refers to substantially incompressible fluids. The term hydraulic refers to technologies that make use of fluids including gas, liquid and/or a combination thereof. Thus, a "hydraulic motor" may be powered by fluid and/or gas pressure and/or a combination thereof. For example, a fluid driving a motor in accordance with the current invention may include water, air, oil, a surfactant, detergent, soap, carbon dioxide and/or a combination thereof.

In some embodiments, motor 50 is a positive displacement type, translates static pressure into mechanical force and through a rotary arm into mechanical torque. Optionally, the incoming flow rate proportional to the mechanical work. Internal leaks that do not participate in generating power are optionally negligible for example between 0 to 2% and/or between 2 to 5% and/or between 5 to 15% loss. In some embodiments, motor 50 includes a piston motor. For example, The measured volumetric efficiency of the motor is above 90% and/or between 70 to 90% and/or between 50 to 70%. The total measured mechanical efficiency is for example between 90 to 100% and/or between 75 to 90% and/or between 50 to 75%. The efficiency may be maintained almost unchanged in the speed range of 0 to 100 RPM. For example the efficiency may change less than 5 and/or between 5 to 15% and/or between 15 to 50%. Optionally, the motor has large inner large passages that reduces pressure losses. For example, motor 50 may operate under pressure range of between 0 to 1 and/or 1 to 2 and/or 2 to 8 and/or 8 to 15 and/or 15 to 25 bar (e.g. pressure range of domestic water network of approximately 3-5 bar). Output torque may depend on the inlet pressure and geometrical properties like piston For example, a 5 piston motor 50 with stroke volume of between 250 to 300 cc may have an output torque of between 3 to 5 [Nm] per 1 bar of inlet pressure. In some embodiments the output torque of the motor may range, for example, between 1 to 2 Nm and/or between 2 to 8 Nm and/or between 8 to 12 Nm and/or between 12 to 25 Nm. In some embodiments, driving fluid for motor 50 may be all or mostly water. Alternatively or additionally, driving fluid for motor 50 may be all or mostly air and/or an air water mixture and/or another fluid. Optionally, motor 50 may have between 3 to 6 pistons and/or between 0 to 3 pistons and/or between 6 to 10 pistons. Alternatively or additionally, motor 50 may include a vane motor (for example as described in later embodiments). In some embodiments, motor 50 is reversible. Optionally, system 50 may clean panel as it moves across the panel in either direction. Alternatively or additionally, a system may clean while moving in a first direction and then return a starting position in a reverse direction without cleaning the panel.

In some embodiments, wheels 17a, 17b hold assembly 10 to an edge 51 of a solar panel. Alternatively or additionally, device 10 may run along a track.

In some embodiments, a solar panel cleaner system 10 may have a fully or partially closed-circuit flow loop (e.g. it may include a fluid recirculation system). For example, fluid may be stored in a reservoir 5. Fluid from reservoir 5 may be pumped by a pump 7 through a filter 8 and/or pressure regulator 9 into a an input line 22 of motor 50. Optionally, fluid sprayed onto panel 11 is subsequently collected in a gutter 13 and drained through a drainage line 6 back to reservoir 5. Alternatively or additionally, the system may be open loop. For example, water may be supplied from a network (e.g. a municipal water supply), sprayed over the panel 11 and/or drained away from the system (e.g. to a wastewater system and/or to water plants and/or to a cooling system etc.).

In some embodiments, a cleaning system (for example system 10 as illustrated in FIG. 2A) comprises two carts 16a, 16b. The carts are optionally disposed at opposing sides of the system. The carts may be structurally connected for example by bars 71, 72, 73. Some or all of the carts 16a, 16b may be self driven, for example by wheels 15. Optionally, a brush 12 is rotatably supported by the first 16a and second 16b carts; a piston motor 50, mechanically linked to the first cart 16a, coupled to brush shaft 14 and driving wheels 15a through train gears 26, 27. Second cart wheels 15b are driven by brush shaft 14 coupled to gear 26 and train gears 27 to ensure that both carts 16a and 16b are moving in straight line, at same direction and same speed. Optionally motor 50 include other kinds of hydraulic motor, for example a fixed displacement motor, a variable displacement motor, a vane motor. It should be noted that preferably the rotation angular direction of the wheels 15 is reversed to the rotation angular direction of brush 12, and; the brush angular velocity is preferably greater than the driving wheels. Piston motor 50 is optionally configured to operate under fluid pressure to run brush 12 and drive wheels 15. For example, piston motor 50 may include a bidirectional motor configured to operate under fluid pressure supplied to a first inlet 1 for driving the device 10 (away from dock position) in a first direction. Optionally, fluid supplied through inlet 1 outlets the system through a drainage tube 4 that is fluidically connected to a hollow portion of bar 71. The drainage fluid then is released through holes in the bar 71. Optionally, a first nozzle assembly (e.g. of bar 71) is located on one side of the device 10. For example, the first nozzle assembly sprays fluid when the device moves in a first direction. Additionally or alternatively, piston motor 50 is configured to operate under fluid pressure supplied to a second inlet 2 to generate rotation in a second (reversed) direction for driving the carriage in a second direction back to its "dock" position. Fluid supplied through inlet 2 is optionally drained through a drainage tube 3 to a hollow portion of bar 72 and/or out holes in bar 72. A valve arrangement 28 is deployed for selectively connecting a source of fluid pressure 22 to each of the first inlet 1 and/or second inlet 2 and/or for connecting the drainage fluid to each of the drainage tube 3 and/or drainage tube 4. Optionally, a second nozzle assembly (e.g. of bar 72) is located on an opposite side of the device 10 from the first nozzle assembly (e.g. of bar 71). For example, the first nozzle assembly sprays fluid when the device moves in a first direction and/or fluid sprays from the second nozzle assembly (e.g. of bar 72) when the assembly moves in a second direction opposite the first direction.

Figure 2B:
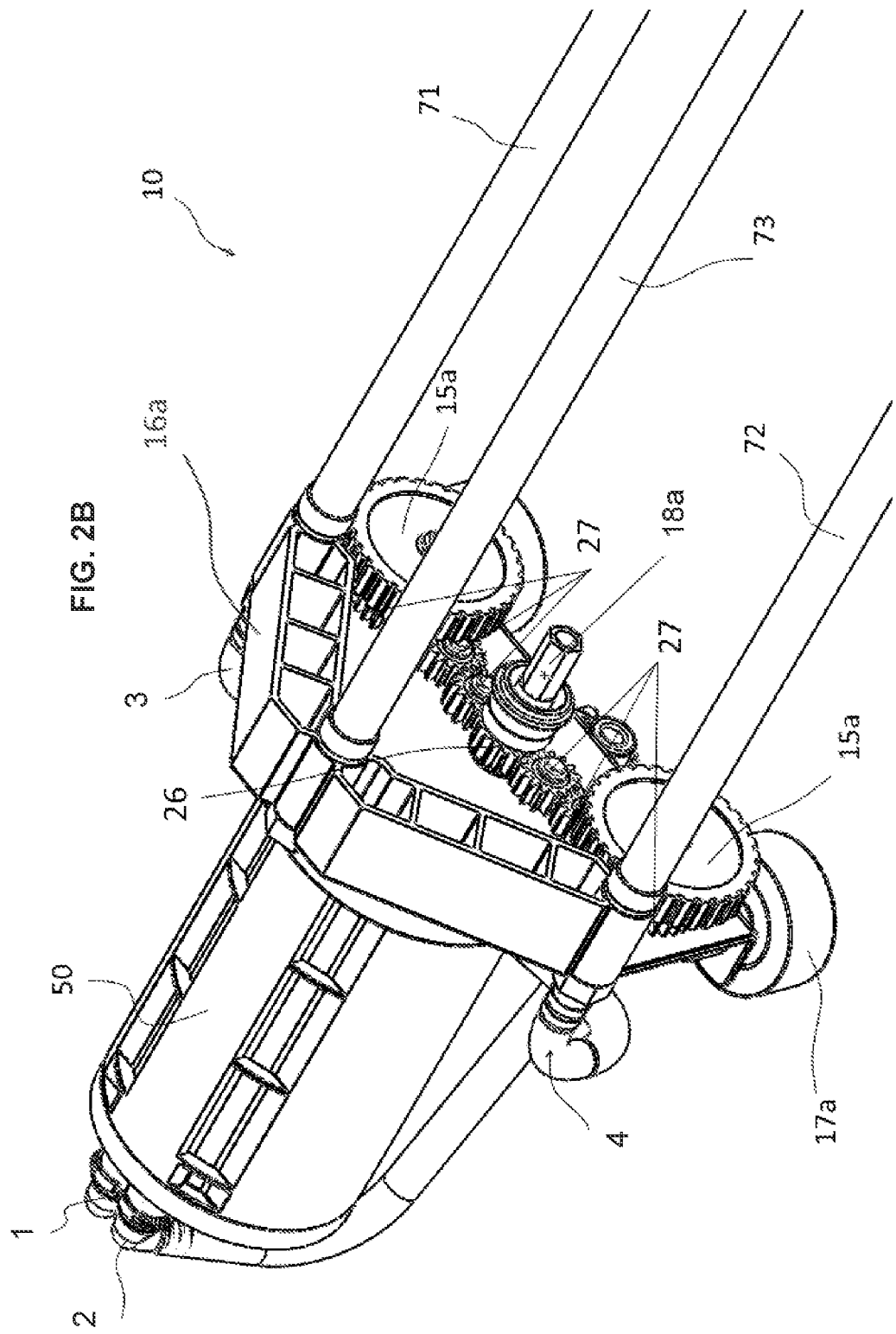
FIG. 2B is a partial isometric view of the first cart of a solar panel cleaning device, constructed and operative according to an embodiment of the present invention.
Figure 5:
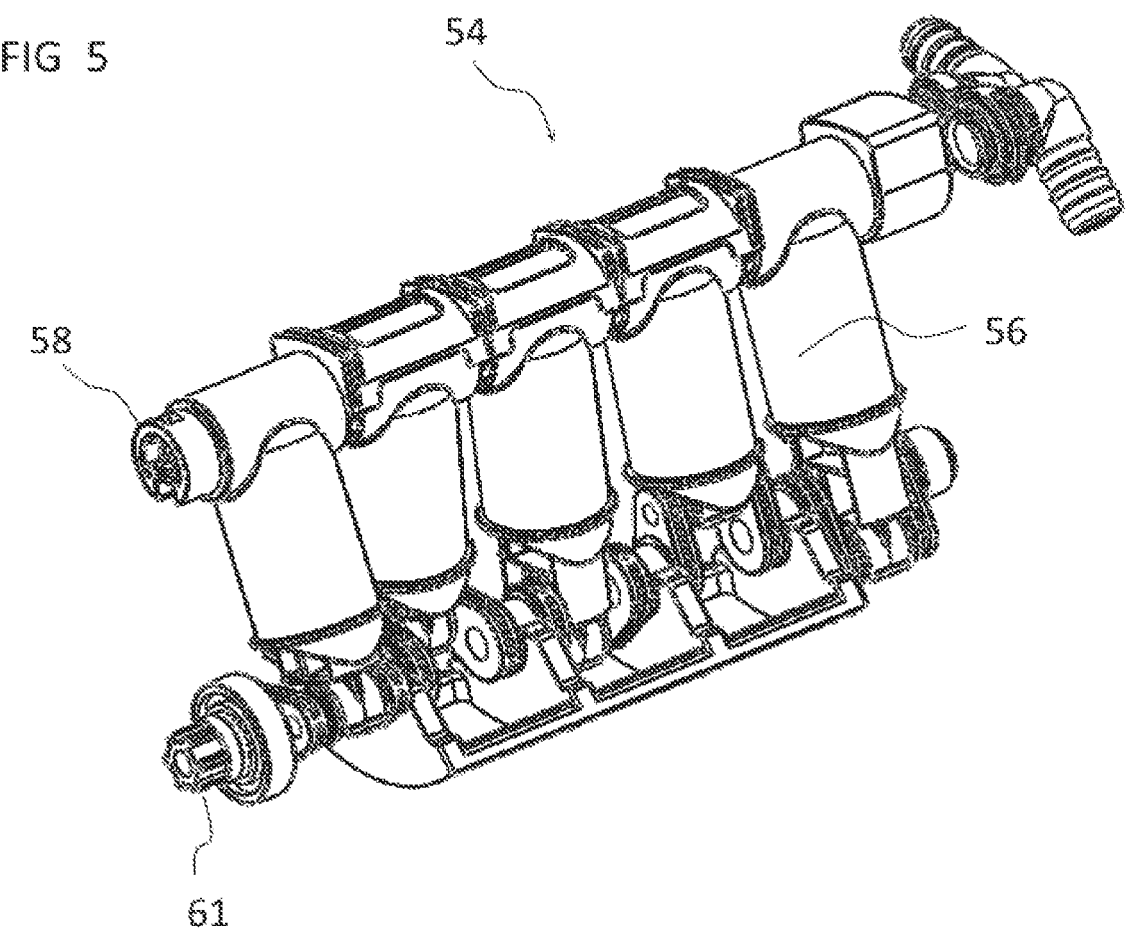
FIG. 5 is an isometric view of a water-driven piston drive assembly from the motor of FIG. 4.

FIG. 2B illustrates details of the first cart 16a including bidirectional fluid powered motor 50. A drive gear 26 is configured to rotate in tandem with motor shaft 61, for example by being mounted directly thereon and/or secured by a key or similar technique. Gear 26 optionally transfers rotational motion from motor 50 to driving train gears 27. Optionally, gears 27 transfer rotational motion to wheels 15a in a reverse direction and/or at a reduced angular rotation rate. Additionally or alternatively, a motor shaft 61 (e.g. as illustrated in FIG. 5) is mechanically linked to drive shaft 18a configured for coupling to the brush. For example, shaft 61 may couple to a brush 12 by a quick coupling, for example a hexagonal shaped coupling. Exemplary brush coupling detail can be seen in FIGS. 3, 11A to 11C, and 12A to 12D. Structural connecting bars 71, 72 are optionally configured to spray the cleaning fluid draining from the motor over the solar panel and/or in front of (e.g. in the path of movement of) the brush 12.

Figure 2C:
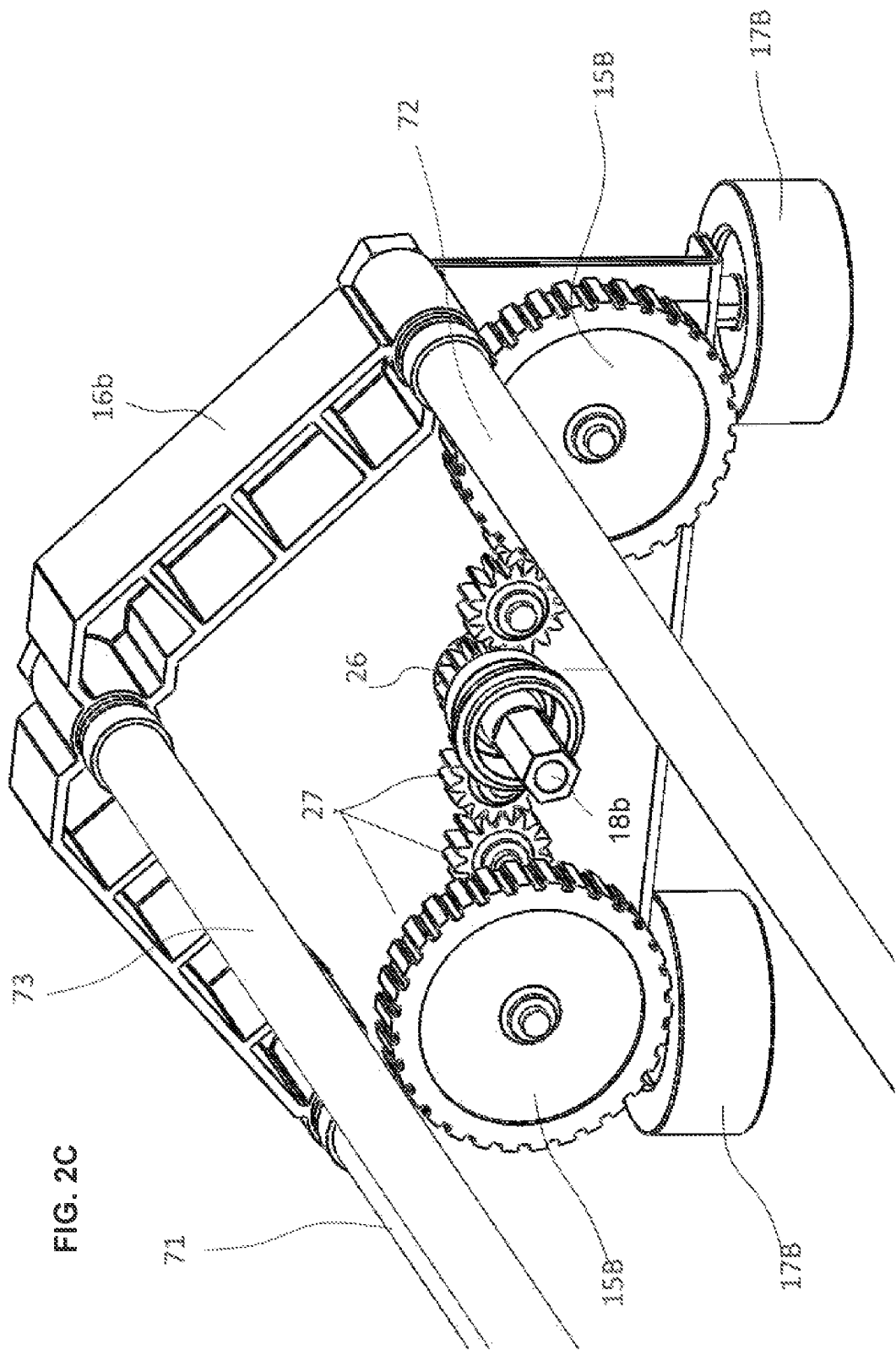
FIG. 2C is a partial isometric view of the second cart of a solar panel cleaning device, constructed and operative according to an embodiment of the present invention.

In some embodiments, control unit 32, batteries 36 and valve arrangement 28 may be integrated in the same housing as a combined unit deployed at a convenient location, for example near end support cart 16a FIG. 2C illustrates the second cart 16b. Torque shaft 18b is optionally driven by brush 12 to rotate. For example, shaft 18b may be connected to a drive element such as a gear 26. Optionally the drive element is engaged to gears 27 and/or wheels 15b. Optionally, the brush 12 drive shafts 18a, 18b and/or transmission (e.g. gears 26 and 27) are configured to ensure that both carts 16a and 16b move together (e.g. in a straight line, at same direction and same speed). Optionally, drive shafts 18a and/or 18b are mechanically coupled to brush shaft by for example, a hexagonal shaped quick connection.

At this stage, it will already be apparent that some embodiments of the present invention provide significant advantages. For example, in contrast to some systems employing electrical motors, the system of the present invention may be installed without any connection to external source of electrical power, with any electrical circuits used for control elements being powered by batteries, avoiding the issues of electrical cables and installations connected to the cleaning system. In some embodiments, the use of positive displacement motors such as piston motors or vane motors, facilitates generating sufficient power for driving the system, based on a common domestic water supply pressure of 2-3. In some embodiments, a system may use higher water supply pressures, for example, between 0 to 1 and/or 1 to 2 and/or 2 to 8 and/or 8 to 15 and/or 15 to 25 bar (e.g. pressure range of domestic water network of approximately 3-5 bar). FIGS. 3, 11, and 12 illustrate possible alternative arrangements of bristles and/or brushes for a brush 12.

FIG. 2D illustrates a system where two cleaning systems 10 are connected longitudinally in accordance with an embodiment of the current invention. In some embodiments, a second brush 12' is connected to connector 18c. Second brush 18' optionally connects on a far end to another carriage (e.g. similar to carriage 16b). For example, the system of FIG. 2D could be used on a set of side by side solar panels and/or on a large solar panel.

FIG. 3 is an isometric view of a brush 12, constructed and operative according to an embodiment of the present invention. Optionally, brush 12 may be used with device 10 and/or in the cleaning system of FIGS. 2A to 2D.

Figure 4:
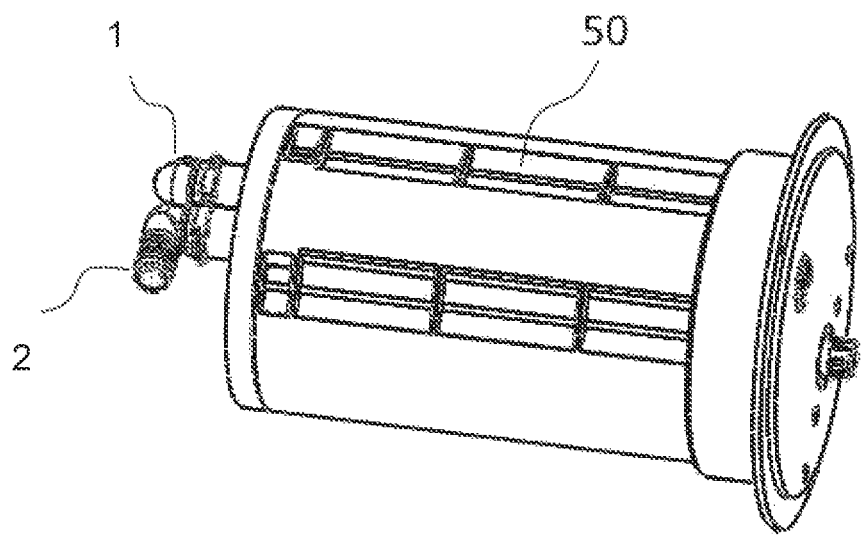
FIG. 4 is an isometric view of a water-driven piston motor, constructed and operative according to an embodiment of the present invention.

Reference is now made to FIG. 4 which illustrates an isometric view of fluid operated motor 50 in accordance with an embodiment of the current invention. In some embodiments motor 50 is a bidirectional motor. Optionally motor 50 has two fluid inlets 1 and 2. For example, fluid entering fluid inlet 1 drives the motor in a first direction and/or fluid entering inlet 2 drives the motor 50 in second direction opposite the first direction. In some embodiments, the output shaft 61 of motor 50 rotates about an axis parallel to the longitudinal axis brush shaft 14. Optionally, motor 50 may be used with device 10 and/or in the cleaning system of FIGS. 2A to 2D.

FIG. 5 illustrates an isometric view of a fluid-driven piston drive assembly 54. For example, drive assembly may be including in motor 50. Optionally, a manifold 58 provides fluid pressure input and drainage connection to each cylinder 56 as a function of the angular position of the cylinder. Optionally, while driving the motor 50, each cylinder located on one side of the drive shaft is connected to pressurized fluid supply while each cylinder located on the other side of drive shaft is connected to the drainage line.

In some embodiments of the present invention, a solar panel cleaning devise may include a fluid-driven vane motor. For example, the vane motor may drive a rotating brush and/or driving wheels.

Figure 6B:
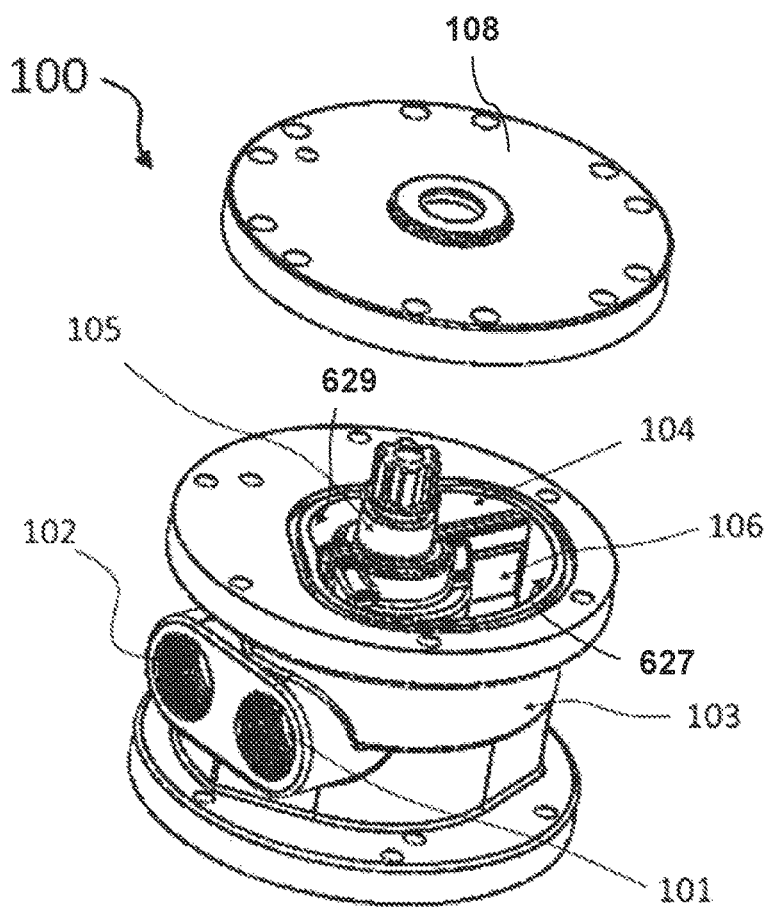
FIG. 6B illustrates an exploded isometric view of vane motor 100 including the first-chamber rotor assembly, constructed and operative according to an embodiment of the present invention.
Figure 6C:
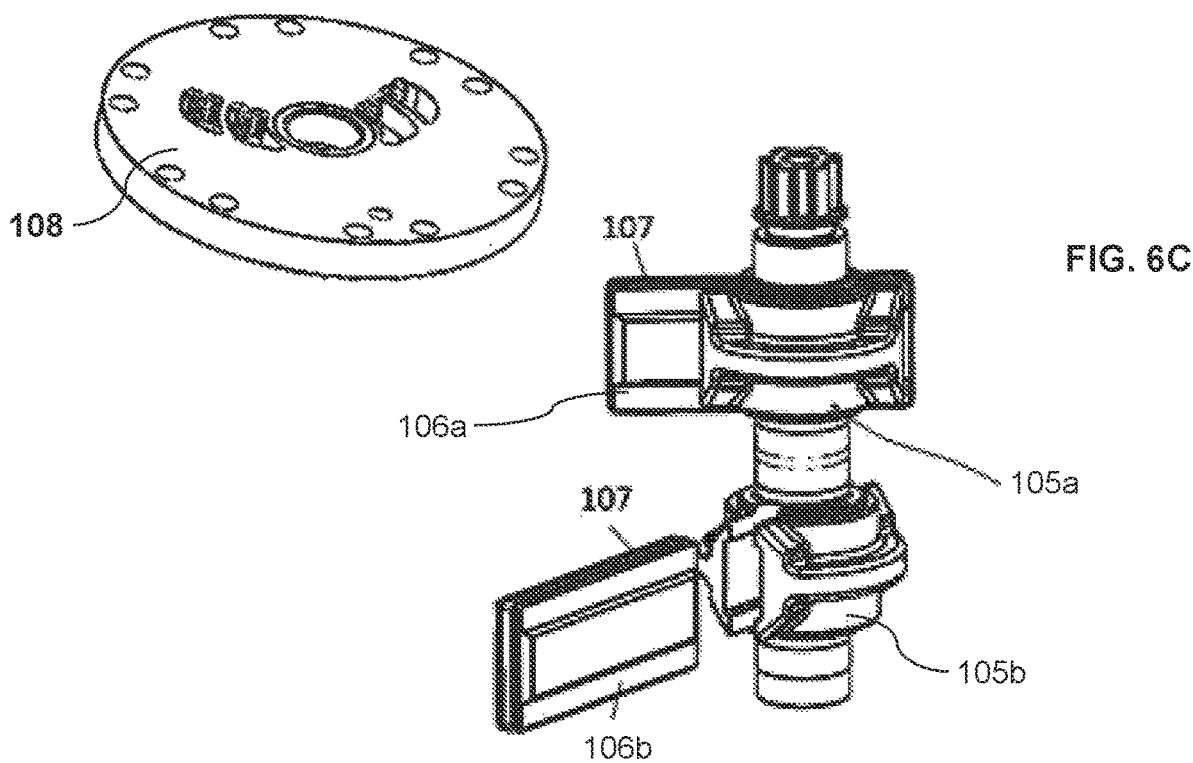
FIG. 6C is a perspective view of the rotor assembly of van-motor in accordance with an embodiment of the present invention.

Reference is now made to FIGS. 6A and 6B and 6C illustrating a vane motor 100 in accordance with an embodiment of the current invention. FIG. 6A is an isometric view of the outside of the exemplary motor 100. FIG. 6B is an isometric exploded view of the exemplary motor. FIG. 6C is an isometric view of a dual rotor assembly of the exemplary motor. In some embodiments, a vane motor includes two separate chambers. The chambers may optionally have an eccentric or a symmetric bore 104 and/or are closed by endplates 108. Optionally, each chamber includes a single rotor 105 associated with a single vane 106 sliding in and out as a result of its interface with the eccentric inner walls. The motor optionally includes an outer a casing 103 defining an inlet 101 and an outlet 102. Inside casing 103 there may be for example the two separate chambers each having a fluid inlet and a fluid outlet and which the chambers geometrically rotated with respect to each other so that the inlet of the first chamber connected to the inlet 101 of the casing and/or the output fluid of the first chamber is connected to the inlet fluid of the second chamber in series and/or the outlet of the second chamber connected to the outlet 102 of the casing 103. Optionally, a single rotor assembly 105a, 105b rotatably mounted within each chamber, and wherein each rotor assembly includes one sliding element (e.g. vane 106a, 106b) extending outwards radially displaceable relative to the axis of rotation, having outer edges 107 configured to form a sliding seal relative to the inner walls of bore 104, wherein the rotors 105a, 105b of the first and second chamber are mechanically connected to each other so that the sliding element of the second chamber is geometrically rotated with respect the sliding element of the first chamber and each sliding element comprises a circumference seal located along the outer edges 107 of the respective vane 106a, 106b, accommodating fitness variation between the vane outer edges 107 and the surrounding chamber wall faces. Optionally, motor 100 may be used with device 10 and/or in the cleaning system of FIGS. 2A to 2D.

In some embodiments, vane motor 100 geometrically designed such that balance force (M) acted upon single vane 106 by the inlet liquid pressure (P) is eccentric to the axis of rotation and/or proportional to difference between the square of the large radius 627 (R) minus the square of the small radius 629 (r) multiplied by the height (H) of chamber 104 (e.g. $M \cong PH/2(R^2-r^2)$)

In some embodiments, vane motor 100 includes a static-fluid-pressure-driven rotary motor. Optionally vane motor 100 includes elastomeric sealing elements. For example motor parts may be made of plastic (e.g. P.P., PBT, Acetal). In some embodiments the motor 100 may have a speed range of 0-300 [RPM] and/or 0 to 500 RMP and/or 0 to 1000 RPM. The vane is optionally activated (slides in and out) by the force applied as a result of its interface with the chamber inner walls. Optionally the pressure operating range of motor 100 is between 0 to 1 and/or 1 to 2 and/or 2 to 8 and/or 8 to 15 and/or 15 to 25 bar (e.g. pressure range of domestic water network of approximately 3-5 bar). Optionally the output torque is proportional to the inlet pressure and depends on the chamber geometric properties (inner wall radii and chamber depth).

In some embodiments, a vane motor 100 achieves effective sealing with low precision components (e.g. plastic components for example injection molded components). For example sealing includes low tolerance parts having a tolerance of between 0.25 to 0.5% of its total length and/or between 0.1 to 0.25% and/or between 0.5 to 1% and/or between 1 to 4% and/or between 0.01 to 0.1%. Optionally motor 100 is water and/or air driven and/or driven by a combination of air and water for example ranging between 0 to 30% water and/or 30 to 70% water and/or 70 to 100% water. For example, motor 100 may be actuated by connection to a domestic water supply or compressed air typically in the range of 2-8 atmospheres.

Figure 7A:
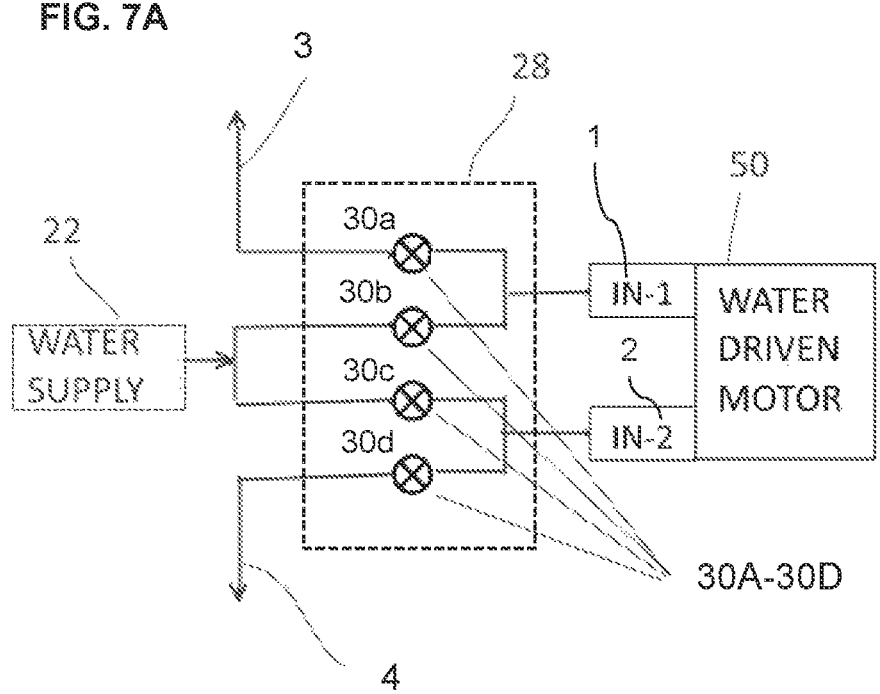
FIG. 7A is a schematic representation of a set of valves in accordance with an embodiment of the present invention.
Figure 7B:
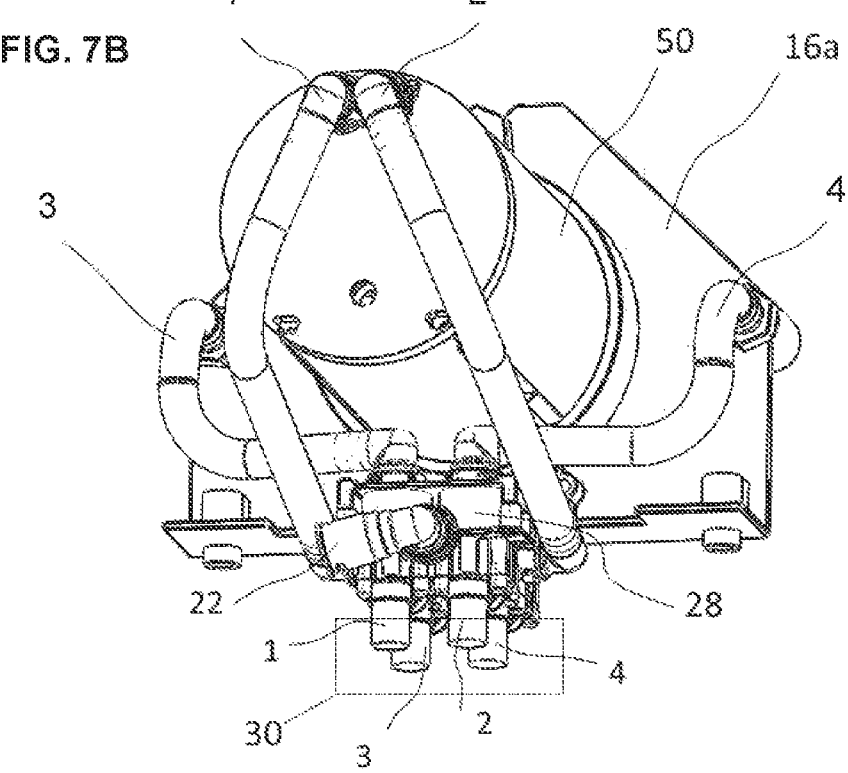
FIG. 7B is a perspective isometric view of a set of the valves and hose connections according to an embodiment of the present invention.

Reference is now made to FIGS. 7A and 7B, describing one preferred but non-limiting implementation valve arrangement 28, preferably configured to operate a fluid driven motor for example piston motor 50. Optionally, the system will be driven in an open loop. For example, a preliminary state may have valves 30a to 30d closed, blocking the main fluid supply 22 and motor lines. A first state may include a fluid pressure source 22 fluidically connected to first inlet 1 with the second inlet 2 fluidically connected to drainage 4. A second state may include a fluid pressure source 22 fluidically connected to second inlet 2 with the first inlet 1 connected to drainage 3.

In the first aforementioned state, valves 30b and 30d are optionally open and/or valves 30a and 30c are optionally closed, providing pressure to inlet 1 and/or draining through inlet 2. In the second state, valve 30a and 30c are optionally open and/or valves 30b and 30d are optionally closed, providing pressure to inlet 2 and/or draining inlet 1. Although this arrangement is believed to be low cost and simple, it should be understood that alternative arrangements for example employing five or more valves, and/or employing 3-state valves to switch between the difference connection states, may also be used.

Valves 28 are preferably electrically actuated valves. In some embodiments, latching solenoids 30 are used. For example, latching solenoids 30 may reduce electrical power usage and/or facilitate a long life cycle for a battery-powered control system. Latching solenoids employ arrangement of permanent magnets or any other suitable "latch" to render the deployed state of the solenoid stable without requiring maintaining an actuating current. In some embodiments, operation of the motor includes an initial actuation pulse to displace the corresponding solenoids to open the required valves, and/or a subsequent pulse to release the latching effect at the end of the motion. Alternatively or additionally, a mechanical operated valve implementation for controlling the motion of the cleaning system, also falls within the scope of the present invention.

In some embodiment of the present invention, the cleaning system 10 is controlled by a battery powered control unit 32, without connection to any external source of electrical power. For example, control unit 32 preferably includes a battery powered controller 34, including suitable electronics, for selectively actuating valve arrangement 28. Controller 34 is optionally powered by batteries 36 and/or receives inputs from one or more sensors 38 (e.g. including a remotely operated RF receiver) through which the cleaning system is operated.

Figure 8:
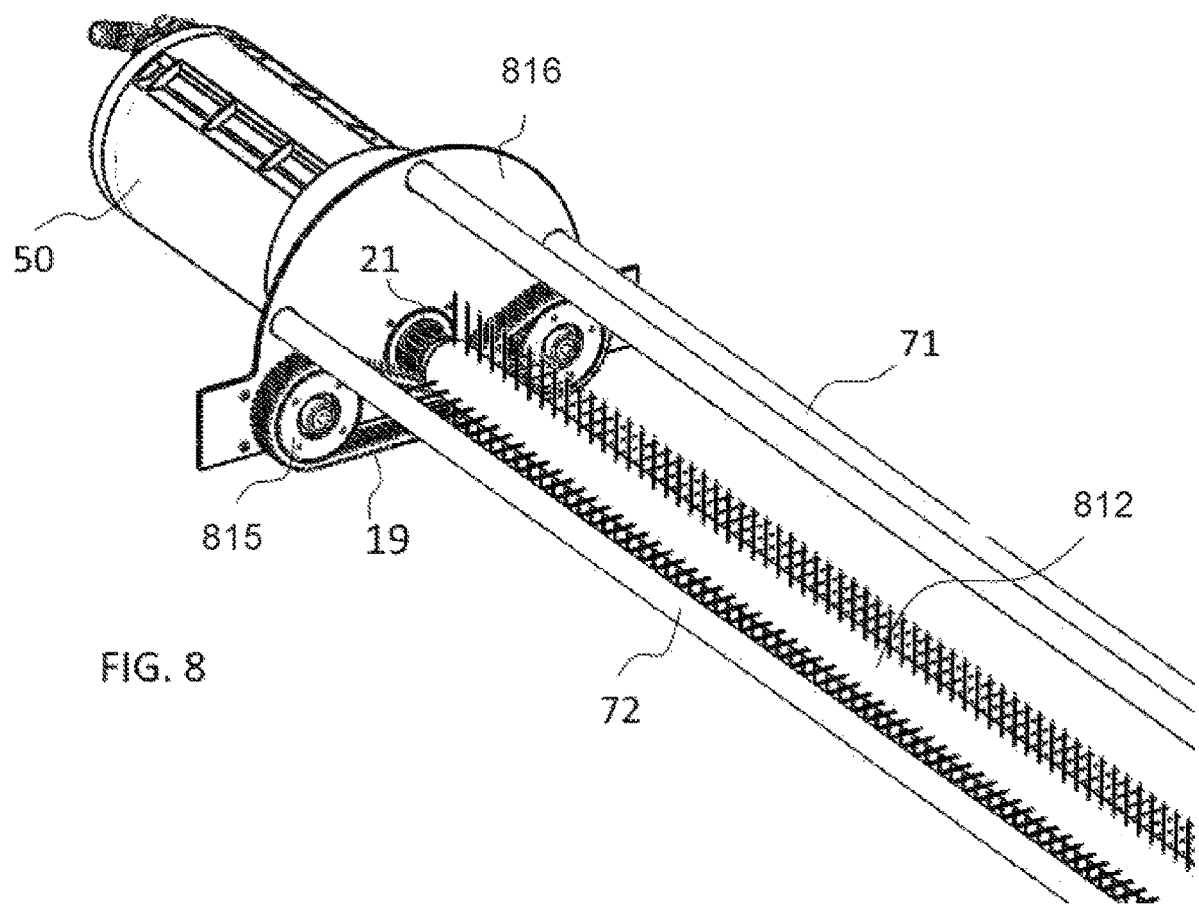
FIG. 8 is an isometric view of a solar panel cleaning device with double sided timing belt, constructed and operative according to another embodiment of the present invention.

FIG. 8 illustrates an embodiment of the present invention wherein a solar panel cleaning devise includes a double-sided teeth belt 19, rotating brush 812 and driving wheels 815. Optionally, a first cart 816 includes bidirectional fluid powered motor 50. In some embodiments, a drive gear 21 is configured to rotate in tandem with motor shaft 61, for example by being mounted directly thereon and/or secured by a key or another technique. The motor 50 optionally serves as a source of rotational motion for driving teeth belt 19. A transmission is optionally configured to transmit rotational motion to wheels 815 in a reverse direction and at preferably lower angular speed.

Figure 9:
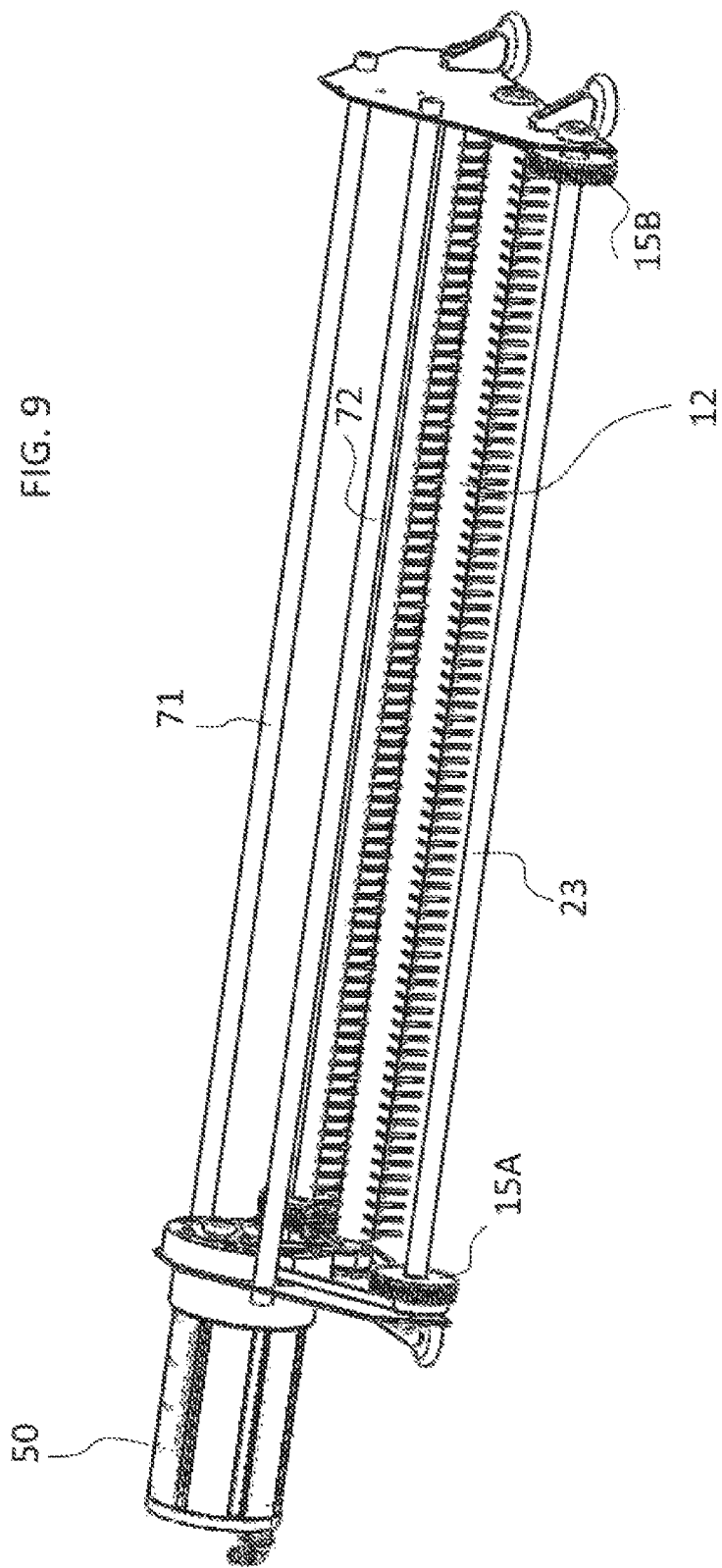
FIG. 9 is an isometric view of a solar panel cleaning device with wheels connected by common shafts, constructed and operative according to another embodiment of the present invention.

In accordance with another aspect of the present for example as illustrated in FIG. 9, a solar panel cleaning devise may include a timing belt, rotating a brush 912 and driving wheels 15a and 15b. The first cart 16a including bidirectional fluid powered motor 50. Driving wheels 15a and 15b configured to rotate in tandem with rotating shaft 23, for example by being mounted directly thereon and secured by a key or similar technique.

Figure 10A:
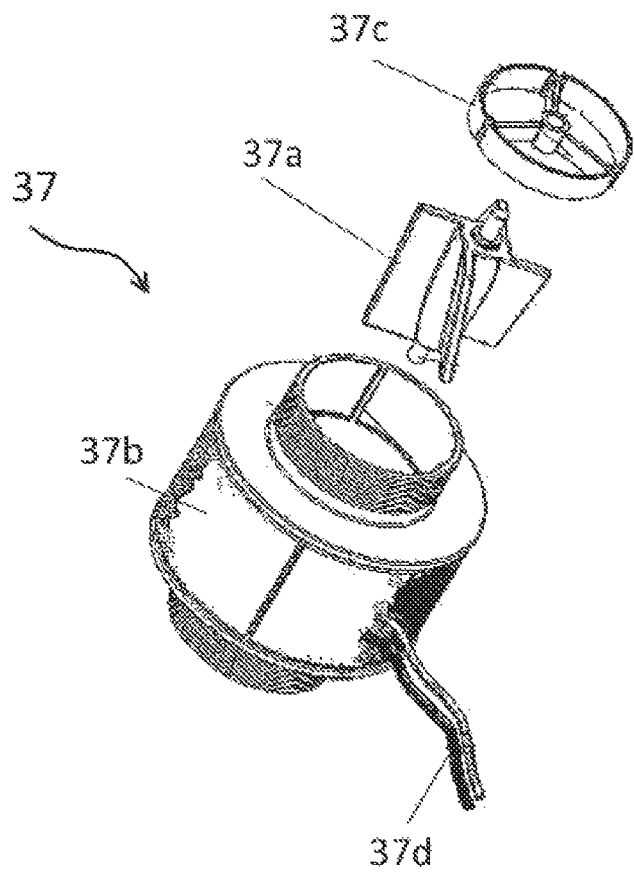
FIG. 10A is an exploded view of a hydro powered electric generator, constructed and operative according to an embodiment of the present invention.
Figure 10B:
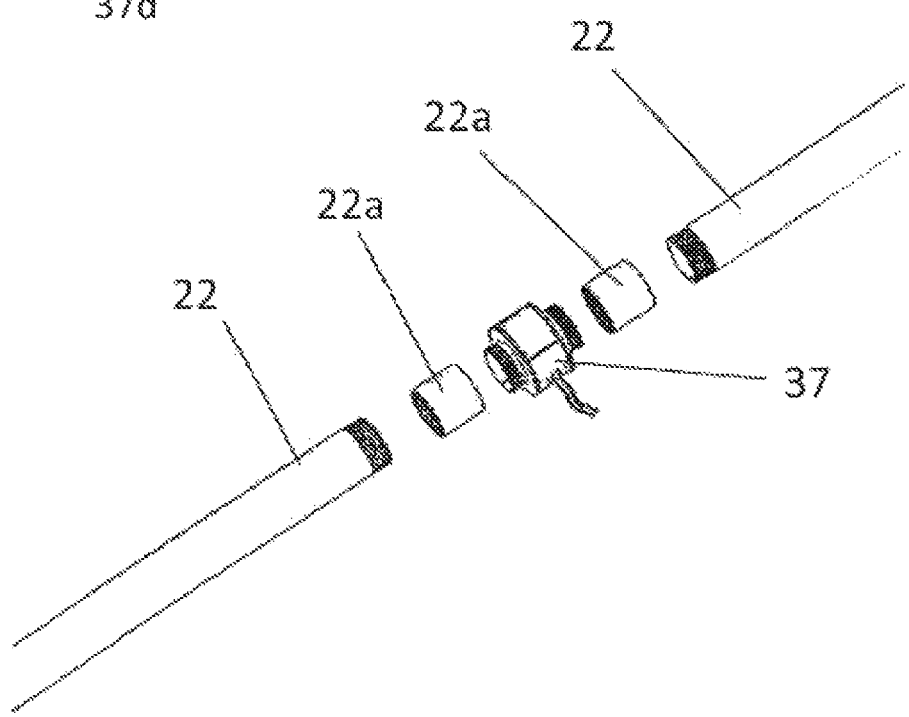
FIG. 10B is an exploded view of a pipeline containing the hydroelectric generator of FIG. 10A, constructed and operative according to an embodiment of the present invention.

In some embodiments, a rechargeable battery or other rechargeable power source may supply energy to components of the cleaning system. Optionally, the battery will be charged by an "inline fluid powered electric generator." For example, the generator may be fully and/or partially disposed within the fluid path. Optionally, the generator may be driven by energy extracted from the flow of fluid through the fluid path. For example, a turbo-generator may be disposed within the fluid path before the motor inlet 1, 2, and/or at the fluid path of motor drainage fluid. An exemplary generator 37 is illustrated in FIG. 10A. For example, a cleaning system may include a generator as described in U.S. Pat. No. 7,723,860. As illustrated in FIG. 10A illustrates an exploded view of a generator including rotor 37a, induction coils 37b, an axle support ring 37c, and output wires 37d. FIG. 10B illustrates the hydroelectric generator 37 disposed in a fluid supply 22 pipeline. Optionally, a generator may include any other type and construction known to those skilled in the art.

In some embodiments, the rechargeable battery or other rechargeable power source may be recharged by a small photovoltaic solar panel located on the panel cleaning devise.

Figure 11B:
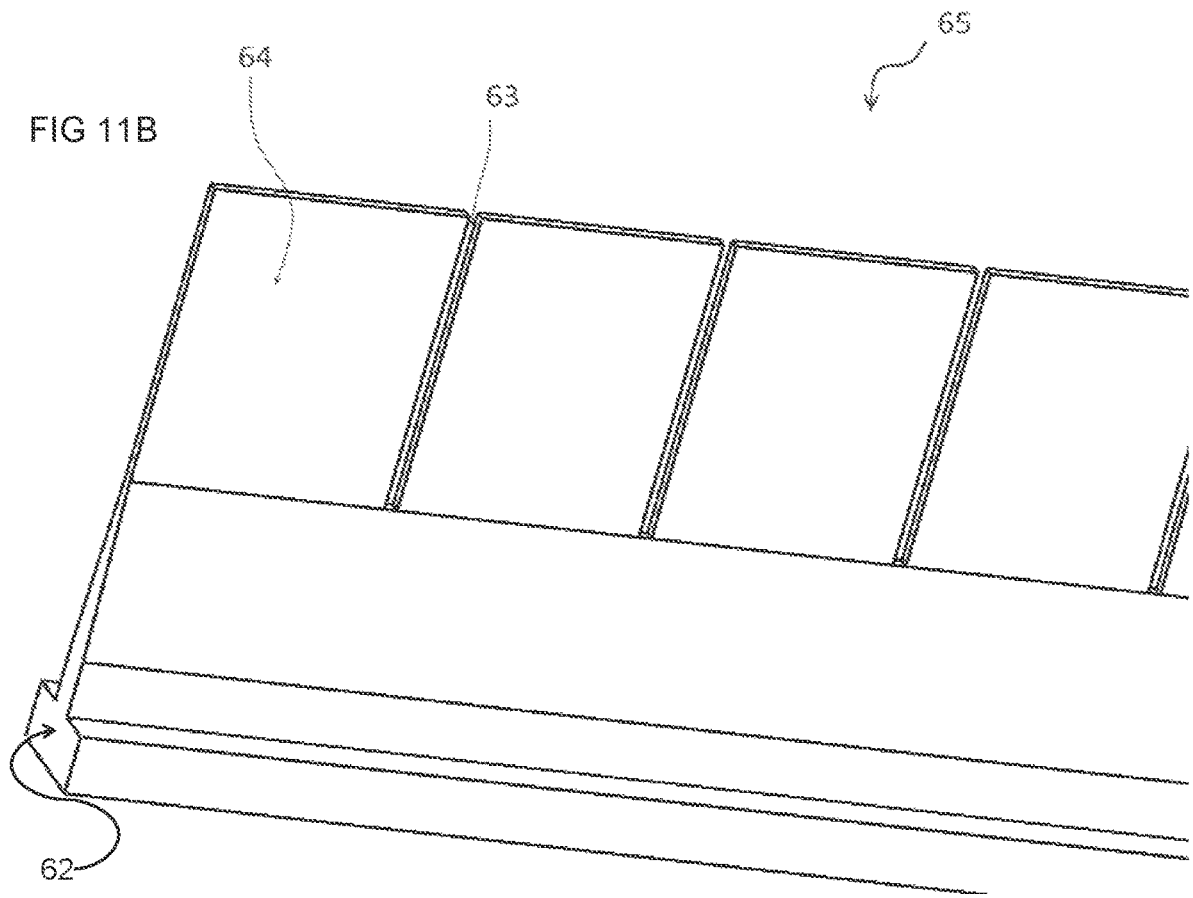
Figure 12D:
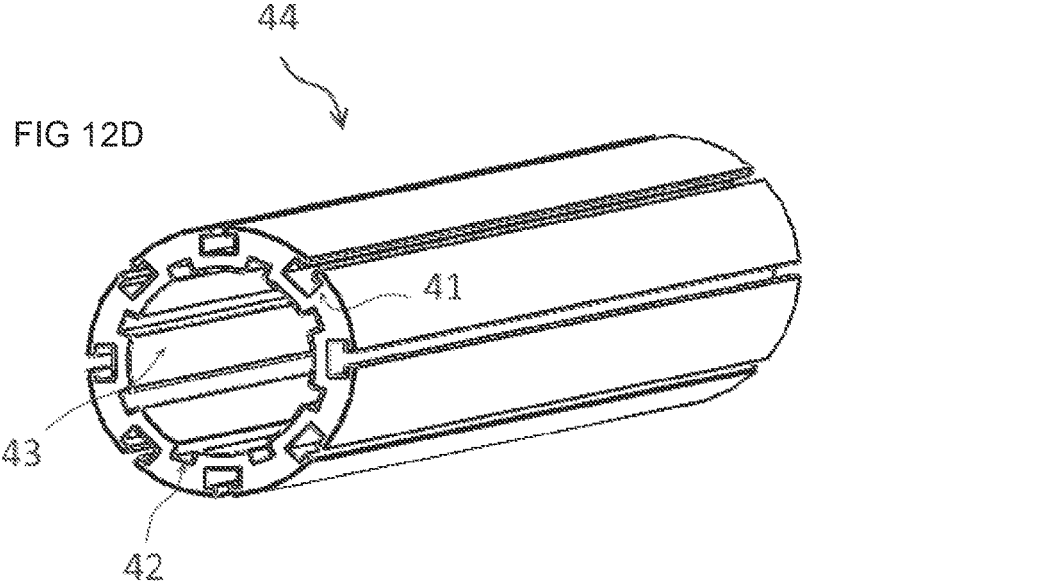
FIG. 12A to 12D are isometric views of a rotational panel cleaning brush-roller, constructed and operative according to another embodiment of the present invention.
Figure 11C:
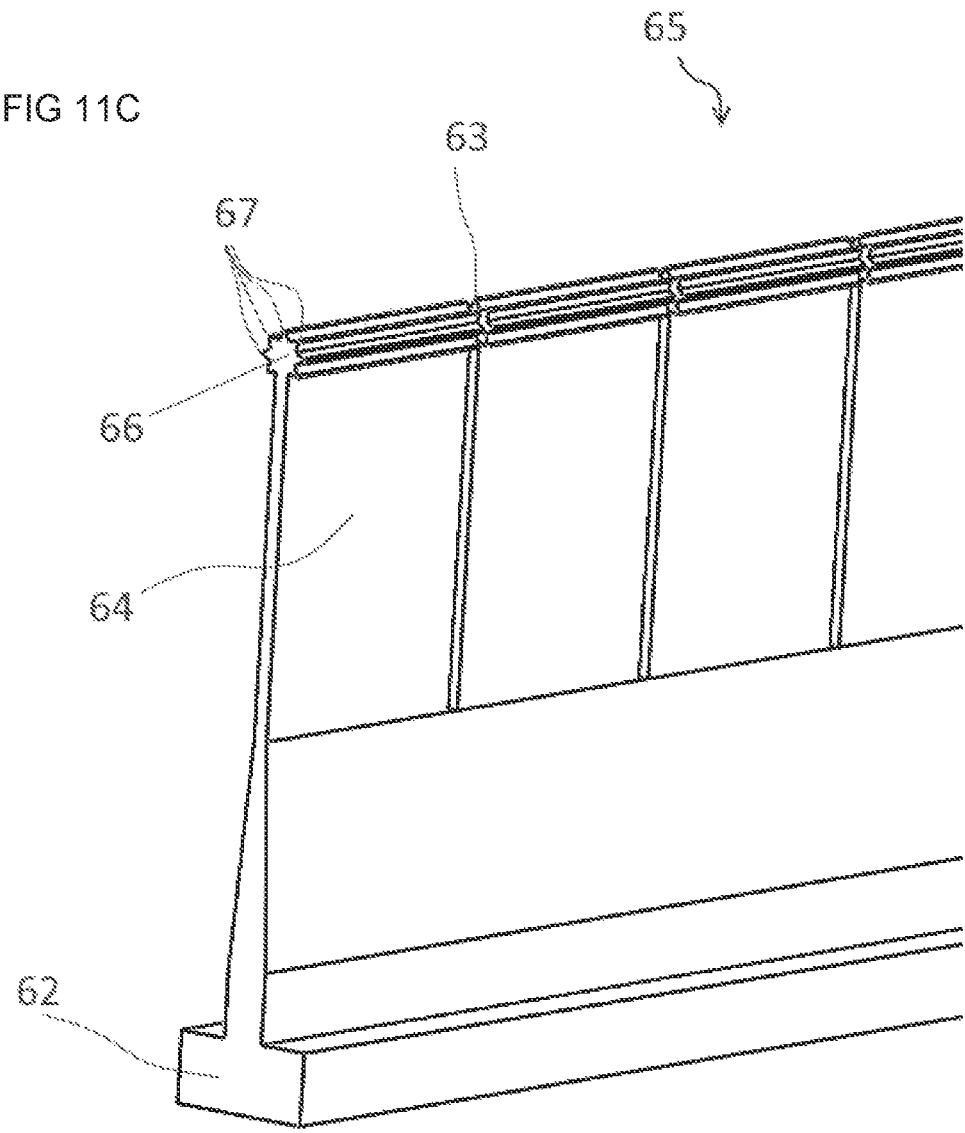
Figure 12A:
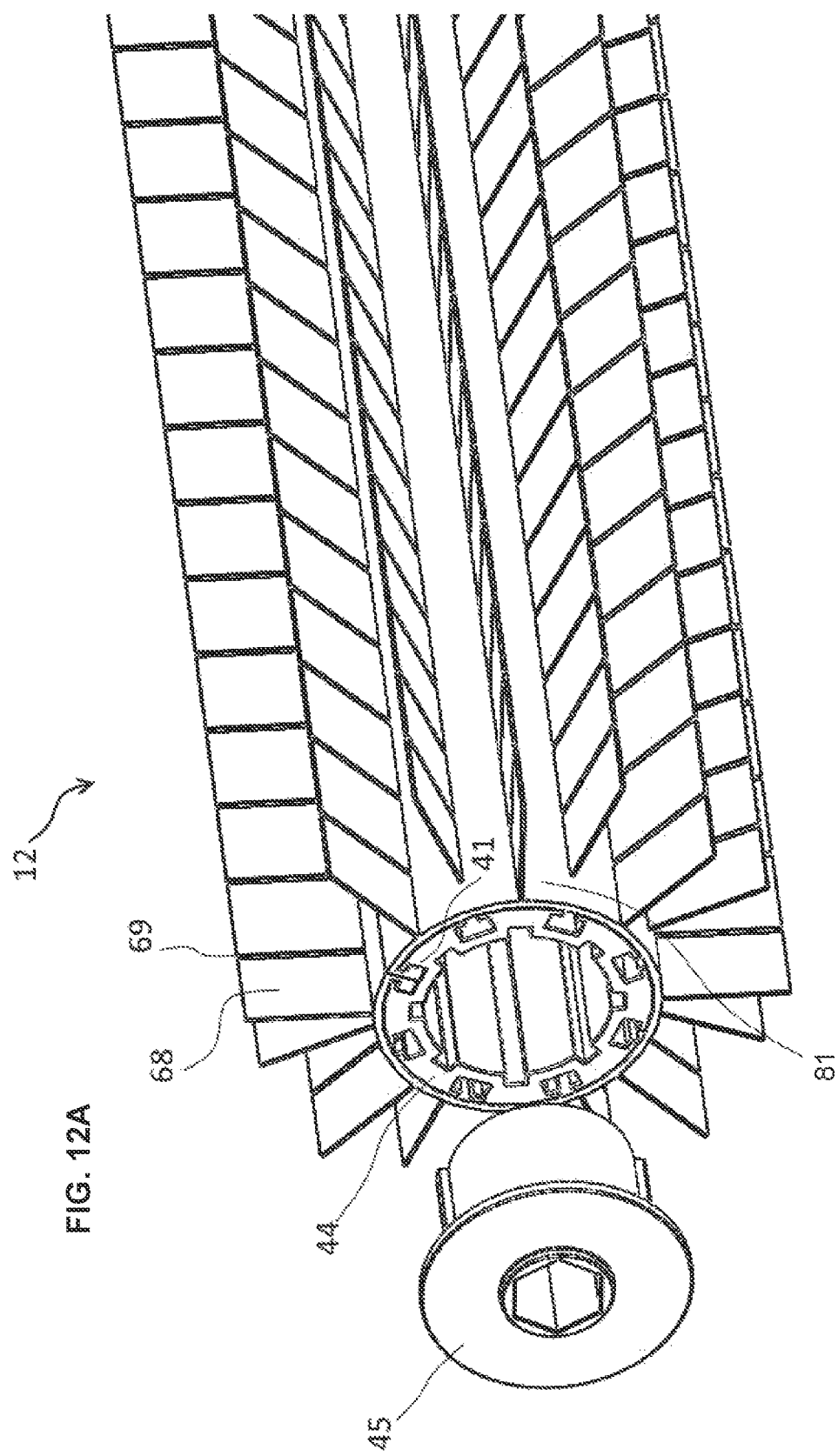
Figure 12B:
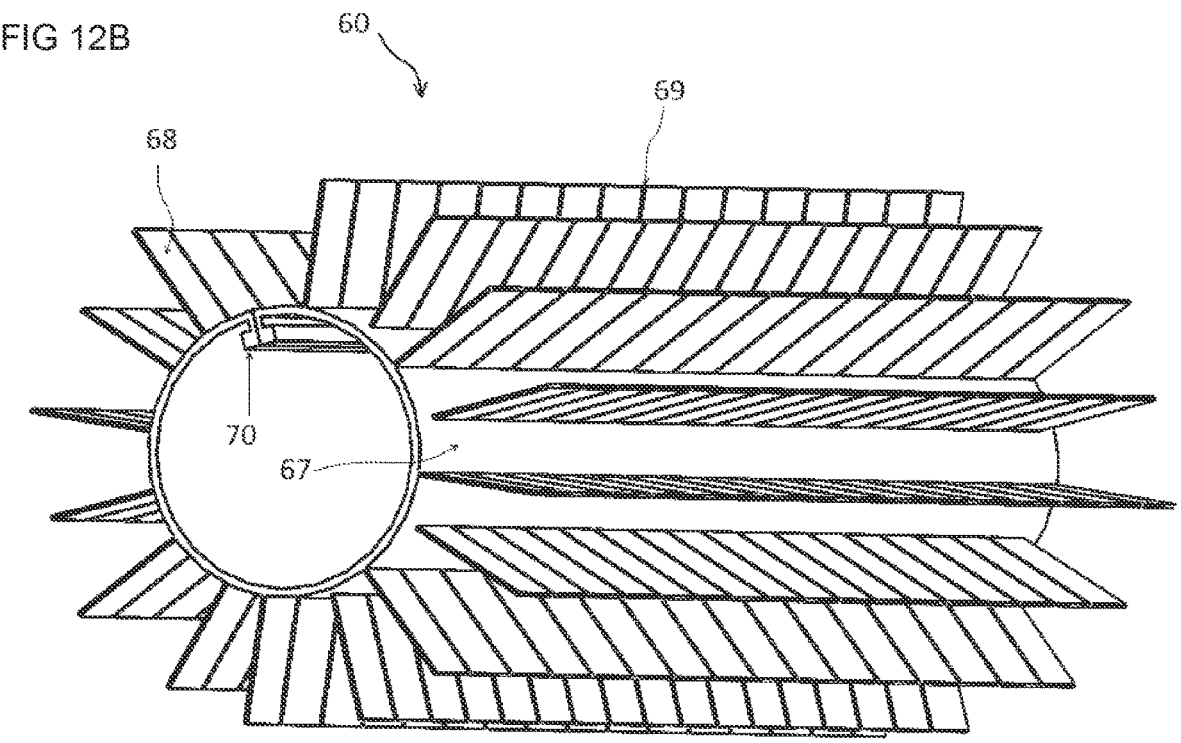
Figure 12C:
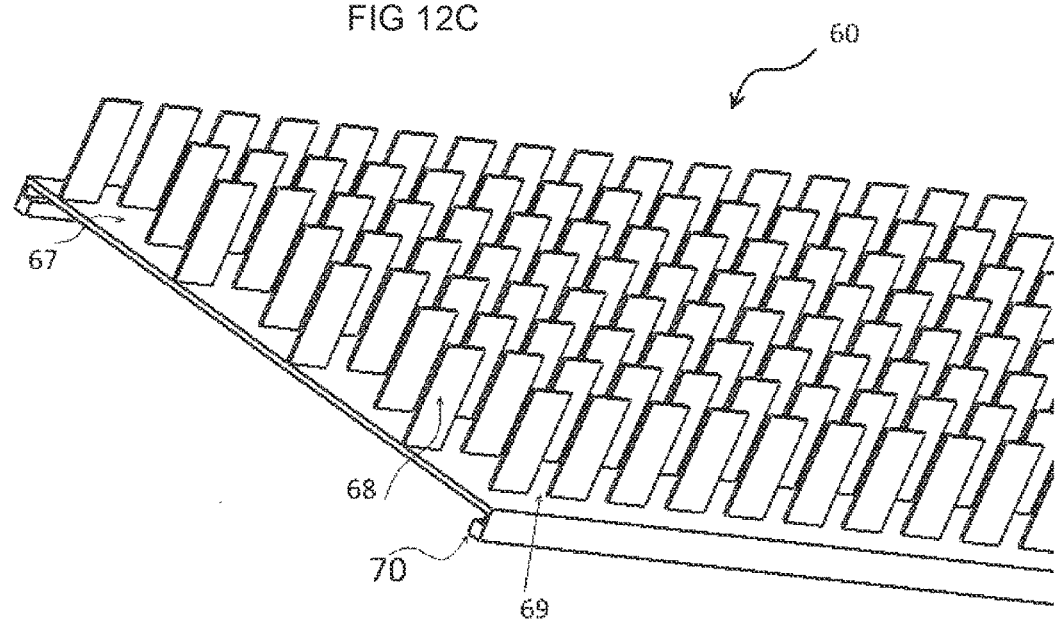

FIGS. 11A-11C illustrate a brush for a panel cleaner in accordance with embodiments of the current invention. For example, a brush may be formed of a central extruded cylinder 44 having longitudinally "T" slots 41 on its outer surface; A bristle strip unit 65 provided with a longitudinal "T" shaped base 62 is optionally inserted into cylinder slots 41. The slots are optionally configured for quick mechanical connection, and/or for quick removal for maintenance. Each strip unit 65 may have a plurality of extending blades 64 separated from one another by gap 63; An end cap 45 may be provided one or both cylinder 44 ends. For example, the cap 45 may inhibit sliding of strip units 65 out during use. End cap 45 is also optionally designed for quick coupling with driving shaft 18a, for example through a hexagonal shaped bore 46. FIG. 11C illustrates another embodiment of strip unit 65 provided with a head 66 with blade shaped bristles 67 projected therefrom.

FIGS. 12A-12D, illustrate a brush in accordance to a further embodiments of the present invention. An exemplary brush assembly illustrated FIG. 12A includes a central extruded cylinder 44 having longitudinally "T" slots 41 on its outer surface; A bristle layer 60 provided with two longitudinal "L" shaped base 70 at opposite ends formed to be inserted into cylinder slots 41 in a way that facilitates a quick mechanical connection and/or quick removal for maintenance. Layer 81 may have a plurality of extending blades 68 separated from one another by gaps 69; An end cap 45 may be provided at one or both cylinder 44 ends, for example to prevent bristle layer 60 from sliding out during use. End cap 45 is optionally designed for quick coupling with driving shaft 18a, 18b and/or 18c through its hexagonal shaped bore.

Figure 13:
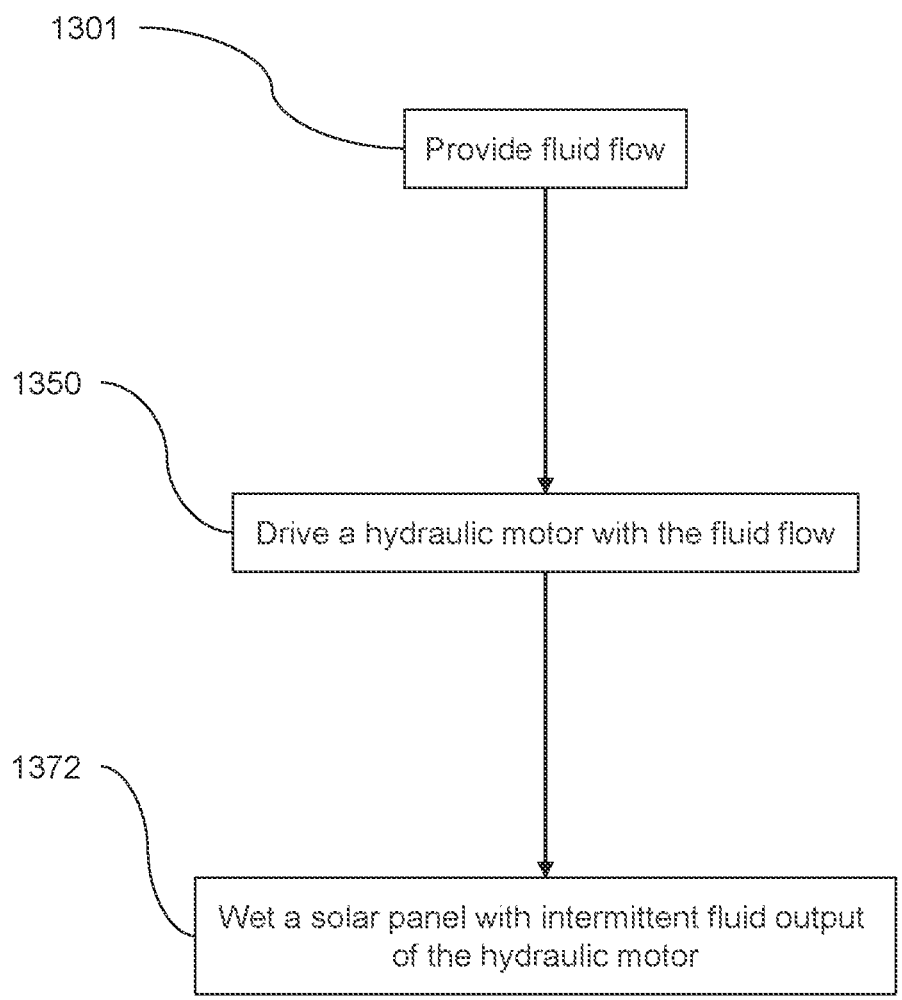
FIG. 13 is a flow chart illustration of a method of cleaning a solar panel in accordance with an embodiment of the current invention.

FIG. 13 is a flow chart illustration of a method of cleaning a solar panel in accordance with an embodiment of the current invention. In some embodiments, a fluid flow is provided 1301. For example, the fluid flow may be supplied at pressure between 0 to 1 and/or 1 to 2 and/or 2 to 8 and/or 8 to 15 and/or 15 to 25 bar (e.g. pressure range of domestic water network of approximately 3-5 bar). Alternatively or additionally, fluid may be supplied at a higher pressure, for example by a commercial and/or industrial water supply. Optionally the fluid flow drives 1350 a hydraulic motor. For example, the motor may be a fixed displacement motor, for example a piston motor and/or a vane motor. Alternatively or additionally, the motor may be a variable displacement motor. In some embodiments, fluid output of the motor may be used to wet 1372 and/or clean the solar panel. For example, water output may be intermittently sprayed and/or dripped onto the panel and/or distributed across the panel (for example using a nozzle assembly). Optionally a brush is used to clean the wet panel. For example, the method of FIG. 13 may be used with the devices of various embodiments as illustrated herein (e.g. in FIG. 15 and/or FIGS. 1 and/or 2A to 2D).

In some embodiments the device may move across the panel at a rate of between 0 to 3 m/min and/or 3 to 12 m/min and/or 12 to 20 m/min. Optionally, the system is driven by fluid flow. For example the fluid may include air and/or water flow and/or combined air and water. For example, the fluid flow rate may range between 0 to 5 l/min and/or between 5 to 15 l/min and/or between 15 to 25 l/min or more. The rate of movement is optionally proportional to the fluid flow rate. The ratio of movement to the flow rate may be dependent on the size of the cylinders and the gear ratio of the transmission.

Figure 14:
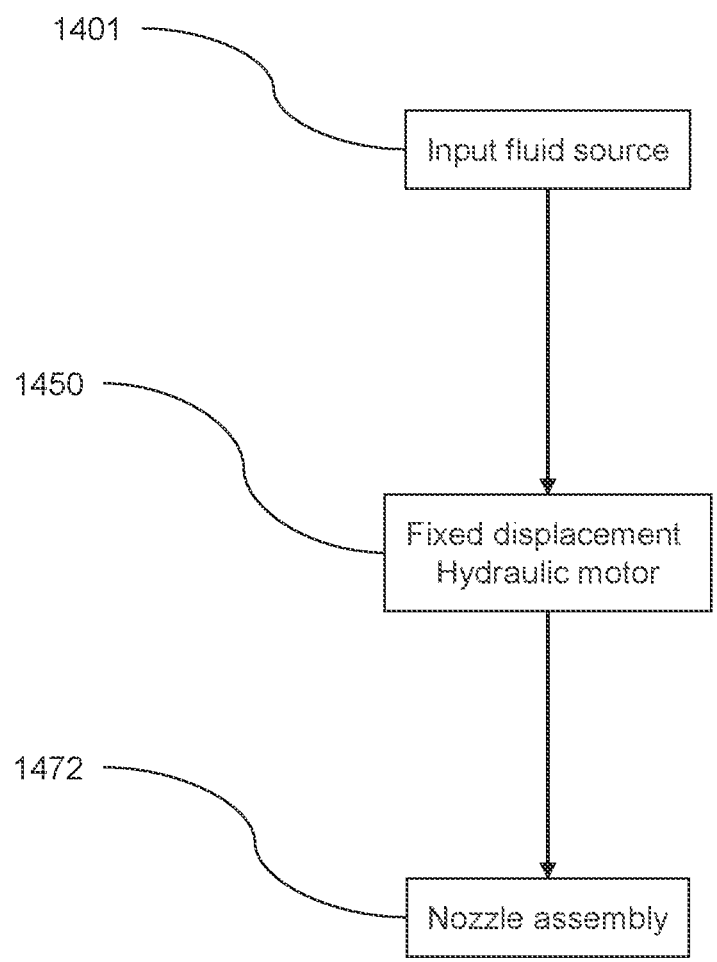
FIG. 14 is a block diagram of a system for cleaning a solar panel in accordance with an embodiment of the current invention.

FIG. 14 is a block diagram of a system for cleaning a solar panel in accordance with an embodiment of the current invention. Optionally the system includes a fluid source 1401. For example, the fluid source 1401 may include a domestic water system. Optionally the fluid pressure of the source may be less than 3 bar. Alternatively or additionally, the fluid source 1401 may include a commercial and/or an industrial water system. For example, the fluid pressure of the source may be greater than 3 bar. In some embodiments, the fluid source is connected to and/or drives a hydraulic motor 1450. Optionally the hydraulic motor 1450 includes a fixed displacement motor, for example a piston motor and/or a vane motor. Alternatively or additionally, the motor 1450 could include a variable displacement motor. In some embodiments, an output of the motor 1450 is connected to a nozzle assembly 1472. For example, fluid output from the motor passes through the nozzle assembly 1472 and is distributed onto a solar panel and/or the panel is cleaned using the fluid. Optionally the water is output intermittent. Alternatively or additionally, the fluid is output at a constant rate. In some embodiments, the motor 1450 may drive a brush to further clean the panel. Examples of the system of FIG. 14 may include other embodiments herein (for example as illustrated in FIGS. 1 and 2A-2D). Optionally, the system of FIG. 14 may perform the method of FIG. 13.

Figure 15:
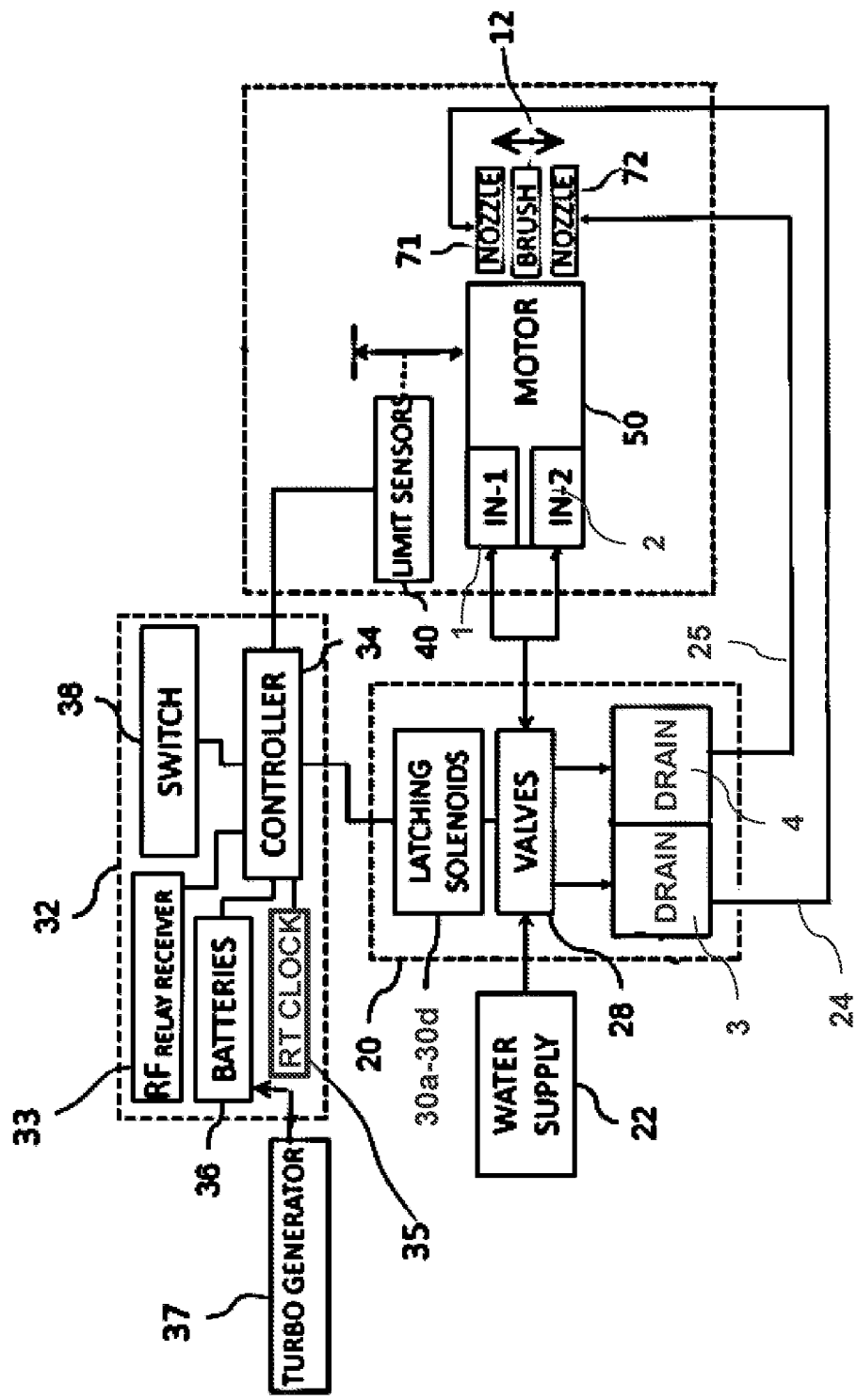
FIG. 15 is a block diagram of a system for cleaning a solar panel in accordance with an embodiment of the current invention.

FIG. 15 illustrates an example of a panel cleaning system, constructed and operative according to an embodiment of the present invention. Optionally the system cleans a solar panel array (for example array 11 of FIG. 1), by spraying fluid. Optionally the fluid may be sprayed through a nozzle, for example an arrangement of holes in a hollow bar 71 or 72. Optionally, fluid is sprayed intermittently The panel surface is optionally wiped by a brush 12.

In some embodiments an air water mixture may be used to power the motor. For example, a Venturi nozzle is optionally positioned on the fluid inlet for producing the mixture. For example, the air water ratio may range between 0 to 0.1 and/or between 0.1 to 0.3 and/or between 0.3 to 0.5 and/or between 0.5 to 0.7 and/or between 0.7 to 1.0. In some cases, the cleaning may be without water or with very little water (e.g. when the air to water ratio is high).

Controller 34 may be implemented using any suitable electronics, typically in the form of a dedicated integrated chip containing appropriate logic circuitry and generating suitable actuation signals to actuate the solenoids 30a-30d. Alternatively, a general-purpose processor may be used operating under suitable software may be used.

In some embodiments a timer is included for intermittent and/or timed operation. For example, a time may include a real time clock 35. For example, clock 35 may be used to activate system 10 one or more times a day and/or between once a day to once a week and/or between once a week to once a month and/or between once a month to once year. Optionally the system may include a radio receiver 33 and/or transmitter. For example, receiver 33 and/or a transmitter may be used for remote control of a cleaning system 10 and/or for remote checking of system integrity. In some embodiments, a cleaning system may include a limit sensor 40. For example, a sensor 40 may report when the system reaches an end of a track. For example, when the system reaches the end of the track, processor 34 may stop and/or reverse movement.

It will be noted that subdivision of components as shown in FIG. 15 between control unit 32 and valve arrangement 28 is exemplary and may differ in various embodiments.

It is expected that during the life of a patent maturing from this application many relevant hydraulic motors, brushes, solar panel will be developed and the scope of the terms in the patent are intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of cleaning a solar panel comprising:
   providing a fluid input at a pressure of less than 6 bar to a hydraulic motor powered by said fluid input, wherein said hydraulic motor produces a fluid output;
   operating a valve arrangement to connect said fluid output from said hydraulic motor to a nozzle assembly;
   receiving at said nozzle assembly said fluid output from said hydraulic motor, said nozzle assembly configured to spray the received fluid output along the solar panel;
   driving bi directional movement of said nozzle assembly along the solar panel with said hydraulic motor powered by said fluid input, wherein said driving comprises said hydraulic motor producing a torque between 2 to 25 Nm under said input fluid pressure of less than 6 bar; and
   cleaning the solar panel by using said nozzle assembly to spray said received fluid output along the solar panel.

2. The method of claim 1, wherein said driving further includes said hydraulic motor rotating at a rate less than 100 RPM.

3. The method of claim 1, further including outputting said fluid output of said motor at a rate less than 1500 ml per meter of said movement of said nozzle assembly.

4. The method of claim 1, further comprising:
   controlling said movement of said nozzle assembly with an electronic controller;
   powering said electronic controller from a battery; and
   charging said battery with a hydraulic generator.

5. The method of claim 1, wherein said driving includes at least one of powering a cylinder with said fluid input and rotating a shaft of a vane motor in said hydraulic motor with said fluid input.

6. The method of claim 1, further comprising reversing a direction of movement of said motor by reversing a fluid flow direction.

7. The method of claim 4, wherein controlling said movement further includes said controller operating a plurality of valves in said valve arrangement to determine determining said fluid input into said motor, wherein a rate and direction of said bi-directional movement is determined by said fluid input.

\* \* \* \* \*